(12) United States Patent
Akiyama et al.

(10) Patent No.: US 9,836,665 B2
(45) Date of Patent: Dec. 5, 2017

(54) MANAGEMENT SYSTEM, LIST PRODUCTION DEVICE, METHOD, COMPUTER READABLE RECORDING MEDIUM, DATA STRUCTURE, AND PRINTED LABEL

(71) Applicant: NEC Corporation, Minato-ku, Tokyo (JP)

(72) Inventors: Tatsuo Akiyama, Tokyo (JP); Yasuyoshi Matsumoto, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/032,216

(22) PCT Filed: Oct. 30, 2014

(86) PCT No.: PCT/JP2014/005497
§ 371 (c)(1),
(2) Date: Apr. 26, 2016

(87) PCT Pub. No.: WO2015/064107
PCT Pub. Date: May 7, 2015

(65) Prior Publication Data
US 2016/0275368 A1     Sep. 22, 2016

(30) Foreign Application Priority Data

Oct. 31, 2013   (JP) ................. 2013-226175

(51) Int. Cl.
*G06K 9/46* (2006.01)
*G11B 27/32* (2006.01)
(Continued)

(52) U.S. Cl.
CPC ......... *G06K 9/4671* (2013.01); *G06K 7/1447* (2013.01); *G06K 19/07758* (2013.01);
(Continued)

(58) Field of Classification Search
CPC .............. G06K 9/4671; G06K 7/1447; G06K 2209/01; G06K 19/07758; G06K 9/46; G06K 9/036; G06K 9/00926; G06T 7/11
(Continued)

(56) References Cited

FOREIGN PATENT DOCUMENTS

| JP | 2003-150603 A | 5/2003 |
|----|---------------|--------|
| JP | 2004-196550 A | 7/2004 |

(Continued)

OTHER PUBLICATIONS

Inoue, an English machine translation of JP2003-150603.*
(Continued)

*Primary Examiner* — Ruiping Li

(57) ABSTRACT

In order to reduce the labor and processing load required during list production and list verification without requiring a specialized reading apparatus, and achieve sufficient identification performance, this management system includes a list storage means that stores a list of objects to be managed, an identification image generating means that detects, from an input image, an identifying part of the objects to be managed and generates the identification image in which the identifying part detected is depicted at a predetermined orientation and size in an image region, an identification image recording means that, when a first image capturing the identifying part of an object to be managed is inputted, records an identification image generated from the first image in the list of objects to be managed as the identification image of a designated identification unit and an identification image verification means that, when a second image capturing the identifying part of an object to be managed is inputted, uses an identification image generated from the second image as a key image, and verifies the key image against respective identification images recorded in the list of objects to be managed.

15 Claims, 22 Drawing Sheets

(51) Int. Cl.
*G06K 7/14* (2006.01)
*G06K 19/077* (2006.01)
*G06Q 10/08* (2012.01)
*G06T 7/11* (2017.01)

(52) U.S. Cl.
CPC .............. *G06Q 10/083* (2013.01); *G06T 7/11* (2017.01); *G11B 27/329* (2013.01); *G06K 2209/01* (2013.01)

(58) Field of Classification Search
USPC ........................................................ 382/165
See application file for complete search history.

(56) References Cited

FOREIGN PATENT DOCUMENTS

| JP | 2006-072919 A | 3/2006 |
|---|---|---|
| JP | 2007-034549 A | 2/2007 |
| JP | 2007-323381 A | 12/2007 |
| JP | 2008-245012 A | 10/2008 |
| JP | 2009-049886 A | 3/2009 |
| JP | 2009-140058 A | 6/2009 |
| JP | 2010-072749 A | 4/2010 |
| JP | 2010-218372 A | 9/2010 |
| JP | 2012-174101 A | 9/2012 |
| JP | 2012-234345 A | 11/2012 |
| JP | 2013-050787 A | 3/2013 |
| JP | 2013-084071 A | 5/2013 |

OTHER PUBLICATIONS

Abe, an English machine translation of JP2009-049886.*
Yamakita, an English machine translation of JP2007-034549.*
Haraiki: an English machine translation of JP2006-072919.*
International Search Report for PCT Application No. PCT/JP2014/005497, dated Feb. 3, 2015.
English translation of Written opinion for PCT Application No. PCT/JP2014/005497.

* cited by examiner

Fig.12
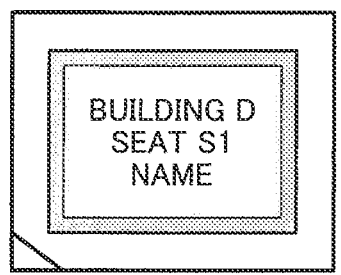
(a)
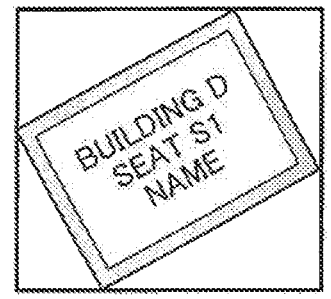
(b)

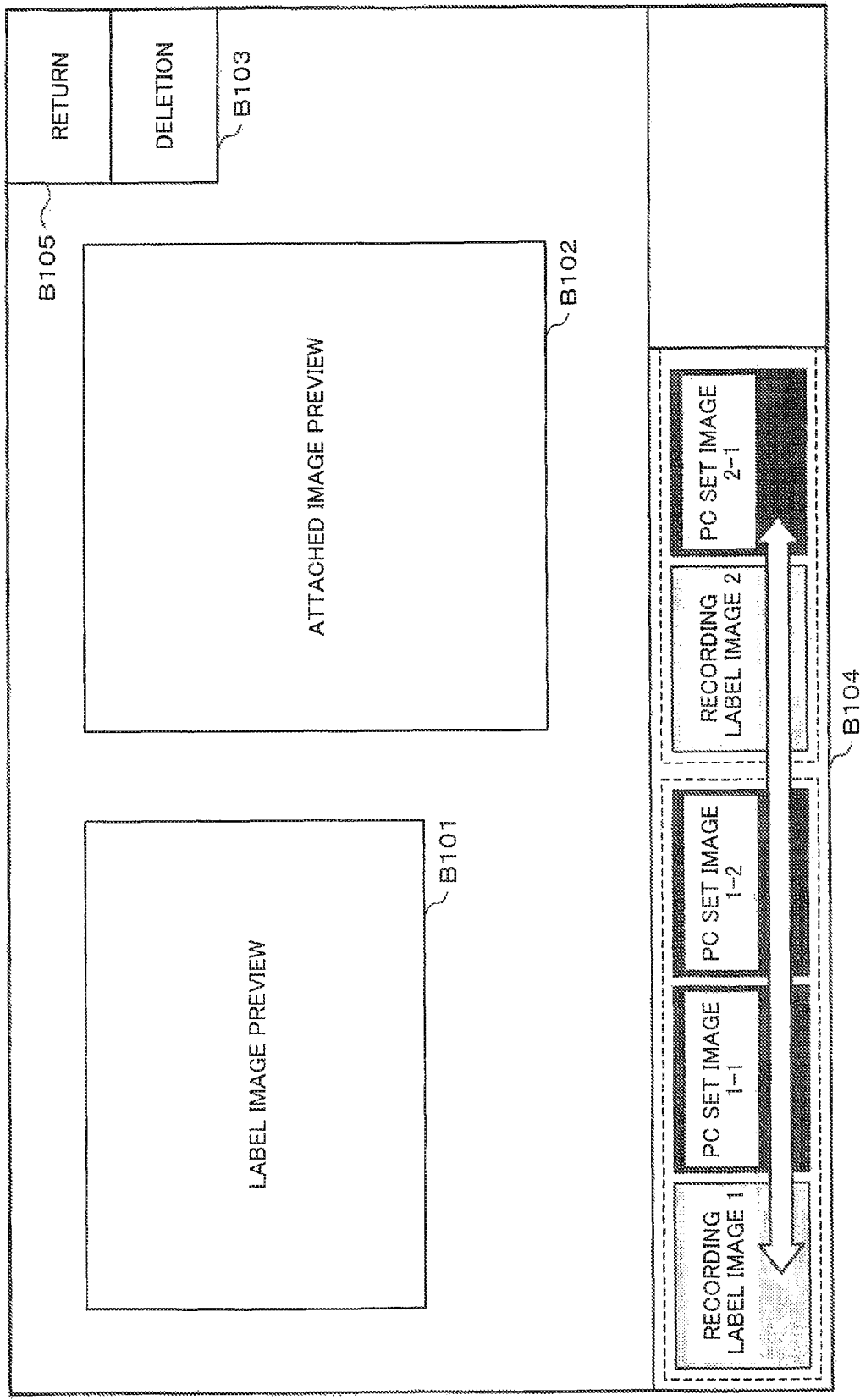

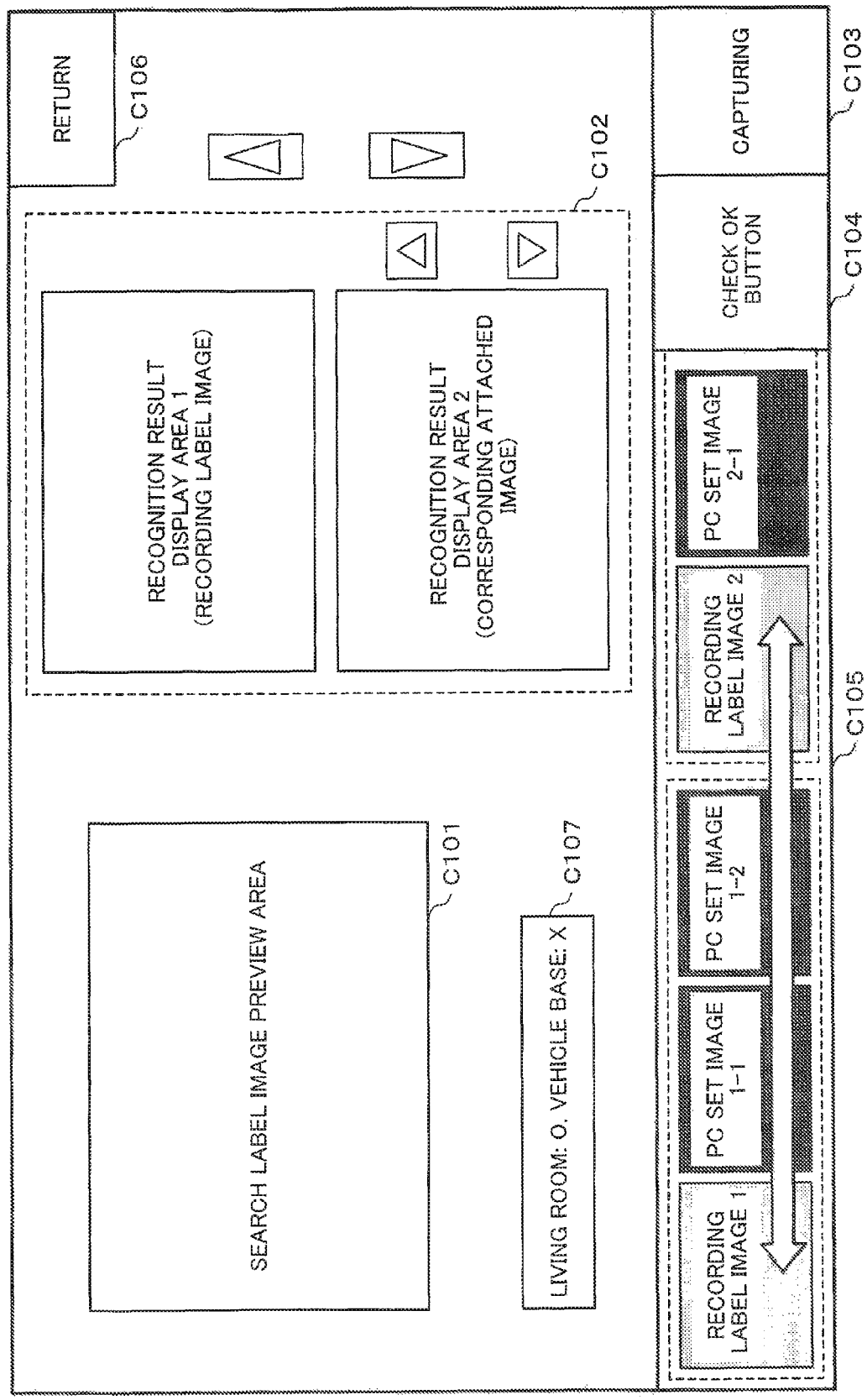

Fig.16

| ID | LABEL IMAGE | CONTENT IMAGE | CHECK POINT | | | | |
|---|---|---|---|---|---|---|---|
| | | | 1:SPOT A | 2:SPOT B | 3:SPOT C | ... | |
| 001 | RECORDING LABEL IMAGE 1 | PC SET IMAGE 1 | LABEL IMAGE 1A AT TIME OF CHECKING / DATE | RECORDING LABEL IMAGE 1B / DATE | RECORDING LABEL IMAGE 1C / DATE | | |
| 002 | RECORDING LABEL IMAGE 2 | PC SET IMAGE 2 | LABEL IMAGE 2A AT TIME OF CHECKING / DATE | RECORDING LABEL IMAGE 2B / DATE | ○ / DATE | | |
| 003 | RECORDING LABEL IMAGE 3 | PC SET IMAGE 3 | | | | | |
| | | PROGRESS SITUATION | 95/100 | 90/100 | 80/100 | 0/100 | |

MANAGEMENT SYSTEM, LIST PRODUCTION DEVICE, METHOD, COMPUTER READABLE RECORDING MEDIUM, DATA STRUCTURE, AND PRINTED LABEL

This application is a National Stage Entry of PCT/JP2014/005497 filed on Oct. 30, 2014, which claims priority from Japanese Patent Application 2013-226175 filed on Oct. 31, 2013, the contents of all of which are incorporated herein by reference, in their entirety.

TECHNICAL FIELD

The present invention relates to a management system that manages objects to be managed by using a list, a list production device used for the same, a list production method, a management method, a computer readable recording medium storing a management program, a data structure, and a printed label.

BACKGROUND ART

In many distribution systems, it is confirmed whether each package item has been correctly transported to a destination by using a package list indicating transport objects. In the package list, transport situations and the like have been registered in association with identifiers of each package item.

Apart from the distribution systems, there are many systems that manage the states and the like of objects (including persons) to be managed by using a list, such as inventory control of goods as well as entrance and exit control of users. However, even in the case of a management system that manages objects to be managed by using a list electronically produced, when the number of objects to be managed is large, manually inputting identifiers for data registration to a list and data verification with the list is complicated and errors easily occur. Therefore, in some cases, identifiers are read from printed labels, IC tags and the like, which have been attached to objects to be managed, by using a dedicated reader such as a barcode reader and an IC (Integrated Circuit) tag reader for reading encoded information, and are inputted to a computer.

In relation to a technology of identifying objects or labels, PTL 1 discloses an example of a code reader for reducing load of identification processing of service display of a discount label and the like. The code reader disclosed in PTL 1 includes a storage part that stores pattern images to be used for pattern identification of service display and service content in association with each other and an imaging means. An image that matches a pattern image stored in the storage part is detected among images taken by the imaging means, by performing pattern identification, and corresponding service content is outputted.

PTL 2 discloses an example of a label inspection apparatus that performs label inspection by using pattern recognition. In the label inspection apparatus disclosed in PTL 2, label master data including specific characters disposed at four corners of a label of an object to be inspected and position coordinates thereof is produced in advance by using a plurality of character fonts and is stored. The label inspection apparatus disclosed in PTL 2 extracts a character font to be displayed on a label of an object to be inspected from label data to be inspected, which is obtained by capturing a label of a product on a conveying means. The label inspection apparatus disclosed in PTL 2 compares label master data using the same character font as the extracted character font and the specific characters and coordinates of the label data to be inspected and thereby conducts inspection.

PTL 3 discloses a server system capable of registering a photographed image of a user as a reference image of image retrieval.

In relation to an image processing technology, PTL 4 discloses an example of an image processor that detects an inclination angle of a multilayered image (for example, an image obtained by separating an original image into a character line part and a pattern part other than the character line part) and performs a rotation processing according to the detected inclination angle.

PTL 5 discloses an image search device. In the image search device disclosed in PTL 5, in search of similar images, a part of a search screen is displayed as a reference image region and images stored in an image storage part are displayed in order to designate a reference image. In the image search device disclosed in PTL 5, condition icons made into icons are displayed in an adjacent search condition area in order to select a desired search condition from a plurality of search conditions and a similar image obtained as a search result is displayed in an adjacent similar image region.

CITATION LIST

Patent Literature

[PTL 1] Japanese Unexamined Patent Application Publication No. 2013-050787
[PTL 2] Japanese Unexamined Patent Application Publication No. 2012-174101
[PTL 3] Japanese Unexamined Patent Application Publication No. 2010-218372
[PTL 4] Japanese Unexamined Patent Application Publication No. 2007-323381
[PTL 5] Japanese Unexamined Patent Application Publication No. 2010-072749

SUMMARY OF INVENTION

Technical Problem

In the case of using a dedicated reader such as a barcode reader and an IC tag reader, since it is necessary to convert identifiers of each object to be managed into barcodes and print the barcodes on labels or to perform write work on an IC tag, there is a problem that labor is required. Furthermore, since the dedicated reader is necessary, there is a problem of increased cost. There is also a problem that, in order to change data formats of the identifiers, software needs to be changed, that is, it is difficult to change the specifications of the identifiers.

Therefore, there are cases in which it is difficult to introduce the dedicated reader. Such cases include, for example, a system in which there are not so many objects to be managed, a system in which data formats of identifiers of objects to be managed differ from one client to another as with office moving business, and a system in which objects to be managed are to be recognized with free formats such as handwritten characters.

PTL 1 discloses a method for identifying the type of labels by using an image pattern recognition technology. However, PTL 1 is based on the assumption that the types of labels are limited in advance, and it does not provide an identification method of labels themselves (individual labels actually attached to goods and the like). PTL 1 does not disclose a plan capable of identifying individual labels not limited in advance, a reduction of a work amount for the plan, and the like.

For example, when the number of labels to be identified exceeds 100 or when handwritten labels are to be identified, it is difficult to register sufficient pattern images with respect to the labels in advance.

Furthermore, even though images of each label taken from all directions may be registered as pattern images, if the orientations of label images obtained for list verification are not uniform, it is probable that erroneous label recognition will occur. On the other hand, in order to obtain label images of a correct orientation for the purpose of list verification, it is a complicated task to ensure that a user captures an image of a label at a correct orientation each time. In the case of light goods, a user may adjust the orientation of the object, but there is also a case in which a user may not be able to adjust the orientation depending on the objects to be managed. In order to reduce the labor of a user, a computer might be used to perform verification by rotating a label image repeatedly by several degrees each time during the list verification process, but a repeated rotation processing during the list verification would impose a heavy load on the computer. As described above, if labels themselves are to be identified using the method disclosed in PTL 1, sufficient identification performance may not be achieved, the labor of a user is required in list registration or list verification in order to achieve sufficient identification performance, or processing load is required.

The method disclosed in PTL 2 is also based on the assumption that specific characters disposed at four corners of a label to be inspected, character coordinates, and a plurality of character fonts are registered as label master data in advance. Therefore, when the number of labels to be identified is large, when a format has not been decided, and when label information may not be registered in advance, its application is difficult or labor is required for list registration.

As described above, PTLs 1 and 2 do not consider a method for achieving sufficient identification performance and reducing labor and processing load during list production and list verification even when the number of labels to be identified is large and a label format may be changed.

PTL 3 discloses a technology of registering a photographed image of a user as a reference image of image search, but it does not aim to identify an object only by the image.

The technology disclosed in PTL 4 is a technology of simply detecting the inclination angle of an image and correcting the inclination, and the literature does not describe its application in any way.

When considering a management system applied to a distribution system, it is preferable that an object with a label may be identified even when the label is incompletely printed. It should also be noted that in a method of performing list verification by using an image recognition technology, objects to which the technology is applied are not limited to labels.

In this regard, an object of the present invention is to provide a management system capable of reducing labor and processing load required during list production and list verification without requiring a specialized reading apparatus and achieving sufficient identification performance, a list production device, a list production method, a management method, a computer readable recording medium storing a management program, a data structure, and a printed label.

Solution to Problem

A management system according to one aspect of the present invention includes a list storage means that stores a list of objects to be managed in which identification images are recorded, each identification image being used for identifying the object to be managed and being associated with a unique identifier in each identification unit, the identification unit serving as a minimum unit for identifying the object to be managed, an identification image generating means that detects, from an input image, an identifying part and generates the identification image in which the identifying part detected is depicted at a predetermined orientation and size in an image region, the identifying part being a predetermined part of an object to be managed or a predetermined attachment to the object to be managed and having a characteristic feature that enables identification of the object to be managed, an identification image recording means that, when a first image capturing the identifying part of an object to be managed is inputted, records an identification image generated from the first image in the list of objects to be managed as the identification image of a designated identification unit, and an identification image verification means that, when a second image capturing the identifying part of an object to be managed is inputted, uses an identification image generated from the second image as a key image, and verifies the key image against respective identification images recorded in the list of objects to be managed.

A list production device according to one aspect of the present invention includes a list storage means that stores a list of objects to be managed in which identification images are recorded, each identification image being used for identifying the object to be managed and being associated with a unique identifier in each identification unit, the identification unit serving as a minimum unit for identifying the object to be managed, an identification image generating means that detects, from an input image, an identifying part and generates the identification image in which the identifying part detected is depicted at a predetermined orientation and size in an image region, the identifying part being a predetermined part of an object to be managed or a predetermined attachment to the object to be managed and having a characteristic feature that enables identification of the object to be managed, and an identification image recording means that, when a first image capturing the identifying part of an object to be managed is inputted, records an identification image generated from the first image in the list of objects to be managed as the identification image of a designated identification unit.

A list production method according to one aspect of the present invention includes an information processing apparatus detects an identifying part of objects to be managed from a first image and generates an identification image in which the identifying part detected is depicted at a predetermined orientation and size in an image region when the first image obtained by capturing the identifying part, which is a predetermined part of the objects to be managed or a predetermined attachment provided to the objects to be managed and has characteristics feature that enables identification of the object to be managed, is inputted, and the information processing apparatus associates the identification image generated from the first image with a unique identifier in each identification unit serving as a minimum unit for identifying the object to be managed and records the identification image in a list of objects to be managed in which an identification image for identifying the object to be managed is recorded.

A management method according to one aspect of the present invention includes an information processing apparatus detects an identifying part of objects to be managed from a first image and generates an identification image in which the identifying part detected is depicted at a predetermined orientation and size in an image region when the first image capturing the identifying part, which is a predetermined part of the objects to be managed or a predetermined attachment provided to the objects to be managed and an identifying part having characteristics feature that enables identification of the object to be managed, is inputted, the information processing apparatus associates the identification image generated from the first image with a unique identifier in each identification unit serving as a minimum unit for identifying the objects to be managed and records the identification image in a list of objects to be managed in which the identification image for identifying the objects to be managed is recorded, the information processing apparatus detects the identifying part of the objects to be managed from a second image and generates the identification image in which the identifying part detected is depicted at a predetermined orientation and size in an image region when the second image obtained by capturing the identifying part of the objects to be managed is inputted, and the information processing apparatus uses the identification image generated from the second image as a key image, and verifies the key image against each identification image recorded in the list of objects to be managed.

A computer readable recording medium storing a management program according to one aspect of the present invention enables a computer, which includes a list storage means for storing a list of objects to be managed in which identification images are recorded, the identification image being used for identifying the object to be managed and associated with a unique identifier in each identification unit serving as a minimum unit for identifying the object to be managed, or an access means capable of accessing the list storage means, to perform a process of, when a first image obtained by capturing an identifying part, which is a predetermined part of objects to be managed or a predetermined attachment provided to the objects to be managed and an identifying part having characteristics feature that enables identification of the object to be managed, is inputted, detecting the identifying part of the objects to be managed from the first image and generating the identification image in which the identifying part detected is depicted at a predetermined orientation and size in an image region and a process of associating the identification image generated from the first image with a unique identifier in each identification unit serving as a minimum unit for identifying the objects to be managed and recording the identification image in the list of objects to be managed.

A data structure according to one aspect of the present invention is the data structure applied to a list for managing objects to be managed, including an identifier of an identification unit serving as a minimum unit for identifying the object to be managed, an identification image in which an identifying part, which is a predetermined part of the objects to be managed belonging to the identification unit or a predetermined attachment provided to the objects to be managed and an identifying part having characteristics feature that enables identification of the object to be managed, has been expressed at a predetermined orientation and size in an image region, and an attached image in which information on the object to be managed belonging to the identification unit has been expressed.

A printed label according to one aspect of the present invention is a printed label used for identifying an object to be managed in a management system that manages objects to be managed by using a list, the printed label including a first area having a characteristic feature capable of specifying an orientation, and a second area including a writing field serving as a guide for a user writing a character, wherein a difference in color between the writing field and a remaining field of the second rea excluding the writing field and a difference in character color used in the writing field and the remaining field are each equal to or more than a predetermined value, the writing field is provided with a frame defined by a line of a color such that a difference between colors of the writing field and areas other than the writing field and the color of a character is equal to or more than the predetermined amount, or a division symbol is provided at a boundary of the writing field.

Advantageous Effects of Invention

According to the present invention, it is possible to provide a management system capable of achieving sufficient identification performance and reducing labor and processing load required during list production and list verification without requiring a specialized reading apparatus, a list production device, a list production method, a management method, a computer readable recording medium storing a management program, a data structure, and a printed label.

BRIEF DESCRIPTION OF DRAWINGS

FIG. 12 is an explanation diagram illustrating another example of a label image.

FIG. 14 is an explanation diagram illustrating an example of a correction screen.

FIG. 15 is an explanation diagram illustrating an example of a search recording screen.

FIG. 16 is an explanation diagram illustrating an example of a list display screen.

DESCRIPTION OF EMBODIMENTS

First Exemplary Embodiment

Figure 1:
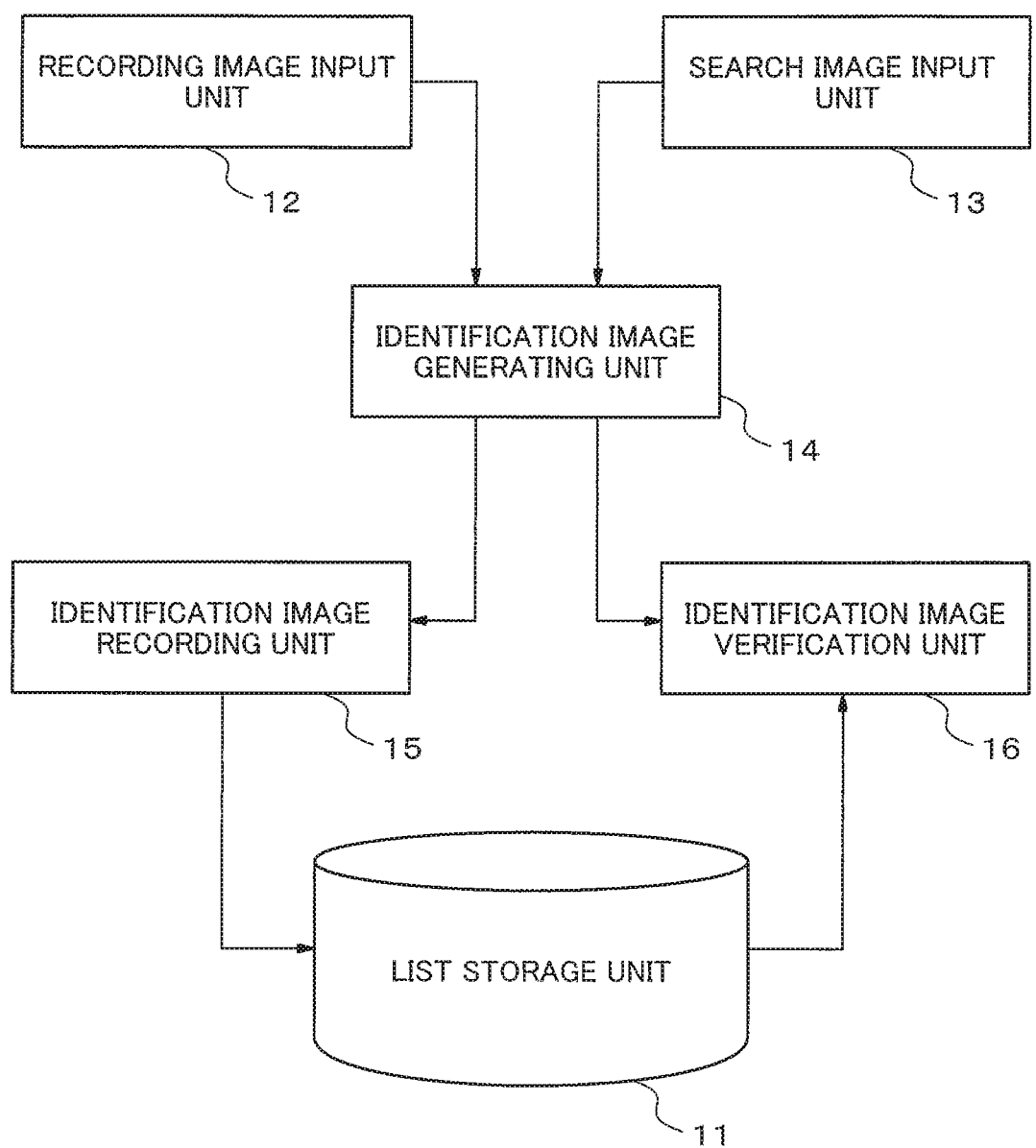
FIG. 1 is a block diagram illustrating a configuration example of a management system of a first exemplary embodiment of the present invention.

Hereinafter, exemplary embodiments of the present invention will be described with reference to the accompanying drawings. Firstly, with reference to FIG. 1, a management system of a first exemplary embodiment of the present invention will be described. FIG. 1 is a block diagram illustrating a configuration example of the management system of the first exemplary embodiment. The management system illustrated in FIG. 1 includes a list storage unit 11, a recording image input unit 12, a search image input unit 13, an identification image generating unit 14, an identification image recording unit 15, and an identification image verification unit 16.

The list storage unit 11 stores a list of objects (including persons) to be managed, in which an identification image for identifying the objects to be managed is registered in association with unique identifiers in each identification unit which is a minimum unit for identifying the objects to be managed. The identification unit is generally a unit for which an identification code is provided. The identification unit, for example, may be each (individual) object to be managed. Apart from individuals, an identification unit merely needs to be a unit used for managing the objects to be managed, and an identification unit may be a unit which includes a plurality of objects to be managed such as a machine model unit, a destination unit, and a production unit (a slot and the like).

The recording image input unit 12 inputs a recording image obtained by capturing an identifying part of an object to be managed. The identifying part is a predetermined part of the object to be managed or a predetermined attachment provided to the object to be managed, and is a predetermined part or a predetermined attachment having characteristics capable of identifying the object to be managed. The identifying part, for example, may be a printed label provided to the object to be managed. When the object to be managed is a person, the identifying part may be a face. When the object to be managed is goods and the like, the identifying part may be an entire package. Preferably, the identifying part has characteristics capable of specifying the orientation of the identifying part, in addition to the characteristics capable of identifying the object to be managed.

The search image input unit 13 inputs a search image obtained by capturing the identifying part of the object to be managed.

The identification image generating unit 14 detects an identifying part from an input image and generates an identification image expressing the detected identifying part at a predetermined orientation and size. Herein, the input image is a recording image or a search image. The predetermined orientation and size may differ in each identification unit. Furthermore, a plurality of predetermined orientation and sizes may be set for one identification unit. In such a case, the identification image generating unit 14 generates a plurality of identification images. The identification image generating unit 14, for example, performs the following processes, thereby obtaining a desired identification image.

Adjusting the size of an area cut from an input image such that the orientation and size of an identifying part in a generated image region become a "correct orientation" and a "correct size (or an occupation ratio)" decided in advance.

An existing enlargement•reduction processing, rotation processing, or inclination correction processing with respect to an area including an identifying part.

For example, there has been known a method for obtaining a pair of corresponding points between a key image and an identification image and using an affine transformation parameter between the key image and the identification image by using a correspondence relation thereof. for capturing an identifying part, a capturing screen including a preview area in which positioning and the like of the identifying part in an image are possible is prepared, and the capturing and the like of the identifying part are performed using the preview area, so that an image including an identifying part with a desired orientation and size may be obtained.

When the recording image has been inputted, the identification image recording unit 15 records the identification image generated from the recording image in the list of the objects to be managed as an identification image of a designated identification unit. More specifically, the identification image recording unit 15 may store the identification image generated from the recording image in the list storage unit 11 in association with an identifier of the designated identification unit.

In a designation method of the identification unit, for example, a user may be instructed to input the identification unit together with the recording image. For example, a user may be instructed to designate an identifier of the identification unit serving as a recording destination, or to designate that a new identification unit is being inputted instead of an identifier. When a new identification unit has been designated from a user, for example, the identification image recording unit 15 may assign a new identifier and record the generated identification image in association with the assigned identifier.

When the search image has been inputted, the identification image verification unit 16 uses the identification image generated from the search image as a key image and verifies the key image against each identification image recorded in the list of objects to be managed. The identification image verification unit 16 may calculate the degree of coincidence between the key image and each identification image recorded in the list of objects to be managed by using an image recognition technology for the purpose of verification. The verification result by the identification image verification unit 16 may be, for example, the degree of coincidence for the key image of each identification image calculated in the verification. The verification result by the identification image verification unit 16 may be an identifier associated with the most similar identification image, that is, an identification image with the highest degree of coincidence. The identification image verification unit 16 outputs a set of a plurality of identification images and identifiers in a descending order of the degree of coincidence. Instead of verifying the key image against the identification images recorded in the list of objects to be managed, the identification image verification unit 16 may determine the degree of coincidence by comparing an area designated in advance of the key image with an area designated in advance of the identification image. In this case, the area designated in advance of the key image is, for example, a user writing area, which will be described later. The area designated in advance of the identification image is, for example, a user writing area, which will be described later. Furthermore, the identification image verification unit 16 may automatically detect partial areas (fixed labels, faces and the like) from the key image and each identification image recorded in the list of objects to be managed, by using a well-known image recognition method, and compare the detected partial areas with each other.

Figure 2:
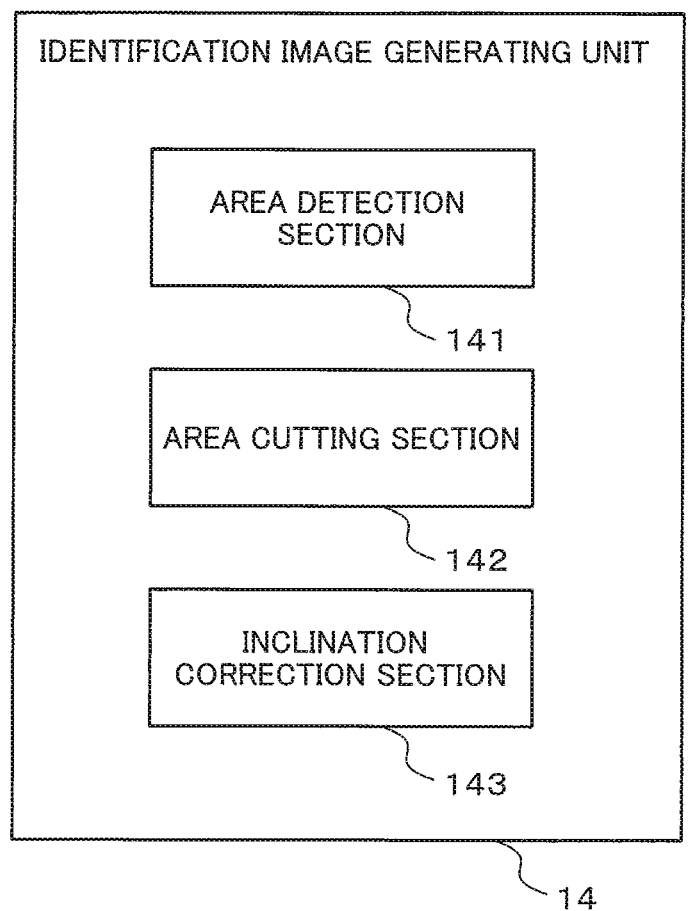
FIG. 2 is a block diagram illustrating a configuration example of an identification image generating unit 14.

FIG. 2 is a block diagram illustrating a configuration example of the identification image generating unit 14. In the example illustrated in FIG. 2, the identification image generating unit 14 includes an area detection section 141, an area cutting section 142, and an inclination correction section 143.

The area detection section 141 detects an image region of an identifying part included in the input image. Based on information on the image region of the identifying part detected by the area detection section 141, the area cutting section 142 cuts a predetermined image region including the identifying part from the input image and generates a partial image having the cut image region. The inclination correction section 143 corrects the inclination of the generated partial image.

Based on a master image which is an image for detecting the identifying part from the input image and an image expressing the characteristics of the identifying part, the area detection section 141, for example, may detect the image region of the identifying part included in the input image.

The area cutting section 142, for example, may cut an image region corresponding to a rectangle that circumscribes the image region of the identifying part. The area cutting section 142 may anticipate that an area will be cut after correction in such a case where the inclination correction section 143 performs a rotation processing, and may cut a rectangular area of a predetermined size centered on the image region of the identifying part.

The inclination correction section 143, for example, may not only perform two-dimensional angular transformation such as a rotation processing for the partial image, but may also perform a well-known three-dimensional angular transformation processing. For example, a method for obtaining the pair of the corresponding points between the key image and the identification image and using a homography matrix, a basic matrix, an elementary matrix and the like between the key image and the identification image by means of the correspondence relation thereof has been known in a computer vision field.

The processing procedures of the area cutting section 142 and the inclination correction section 143 are not limited thereto. For example, the area cutting section 142 may at first simply designate an area to be cut, and may allow the inclination correction section 143 to correct an inclination of the designate area, and then cut the area from the corrected image such that the identification image has a predetermined size.

According to the identification image generating unit 14 as described above, an identification image expressed at a predetermined orientation and size may be generated. When the orientation of an identifying part (a printed label and the like) relative to an object to be managed is fixed and a recording image, in which the orientation of the object to be managed is constant, may be easily captured, the inclination correction section 143 may be omitted. In such a case, an identification image having an image region corresponding to a rectangle that circumscribes the identifying part may be generated from an input image, thereby obtaining an identification image in which the orientation of the identifying part in the image region is fixed so as to coincide with the relative orientation of the identifying part to the object to be managed.

Figure 25:
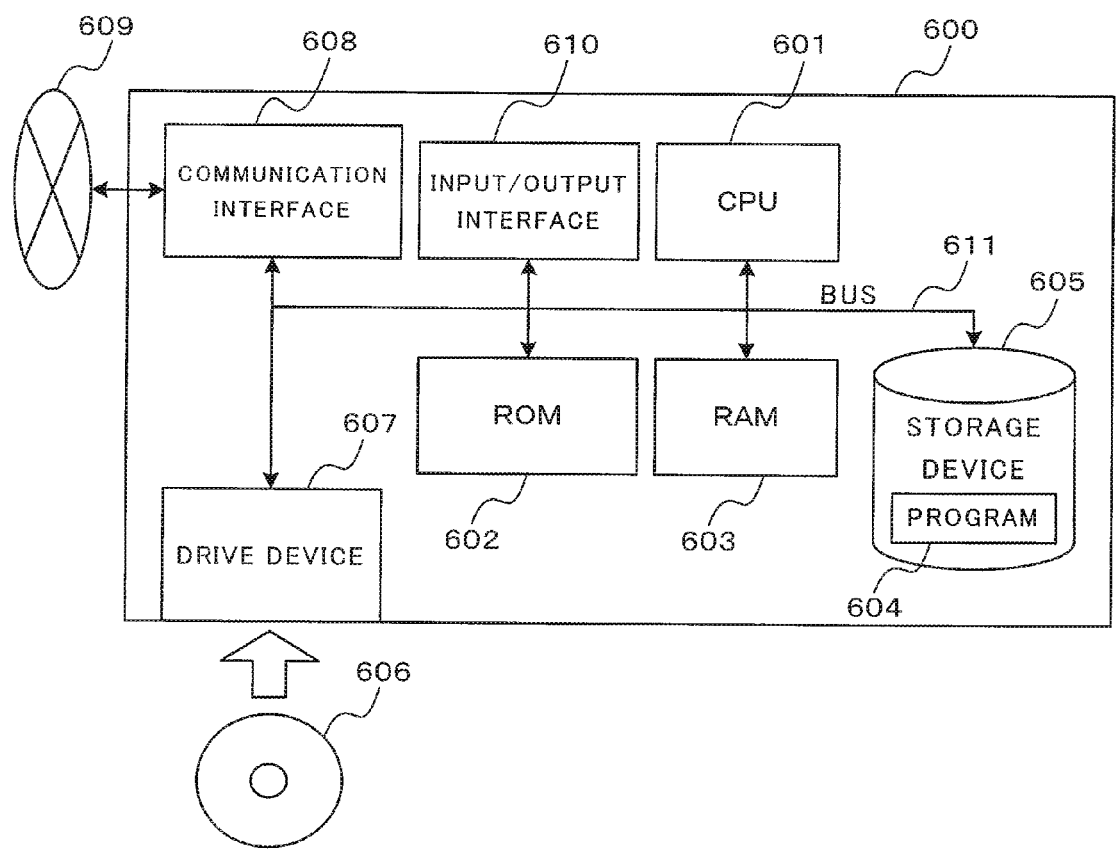
FIG. 25 is a diagram illustrating an example of a configuration of an information processing apparatus for realizing of a management system in each exemplary embodiment of the present invention.

In the present exemplary embodiment, the list storage unit 11 is realized, for example, by a storage device. The recording image input unit 12 and the search image input unit 13 are realized, for example, by an input device capable of inputting image data such as an imaging means, or an interface unit with an external device including such an input device. The identification image generating unit 14, the identification image recording unit 15, and the identification image verification unit 16 are realized, for example, by an information processing apparatus 600 operating according to a program of CPU (Central Processing Unit) and the like as illustrated in FIG. 25. The information processing apparatus 600 includes, for example, the following configuration.

CPU 601
ROM (Read Only Memory) 602
RAM (Random Access Memory) 603
Program 604 loaded on RAM
Storage device 605 for storing program
Drive device 607 for performing reading and writing of storage medium 606
Communication interface 608 connected to network 609
Input/output interface 610 for performing data input/output
Bus 611 for connecting elements to one another Next, an operation of the management system of the present exemplary embodiment will be described. The operation of the management system of the present exemplary embodiment is largely classified into a list production operation for recording necessary information in a list and a list verification operation for searching the list to obtain the necessary information.

Figure 3:
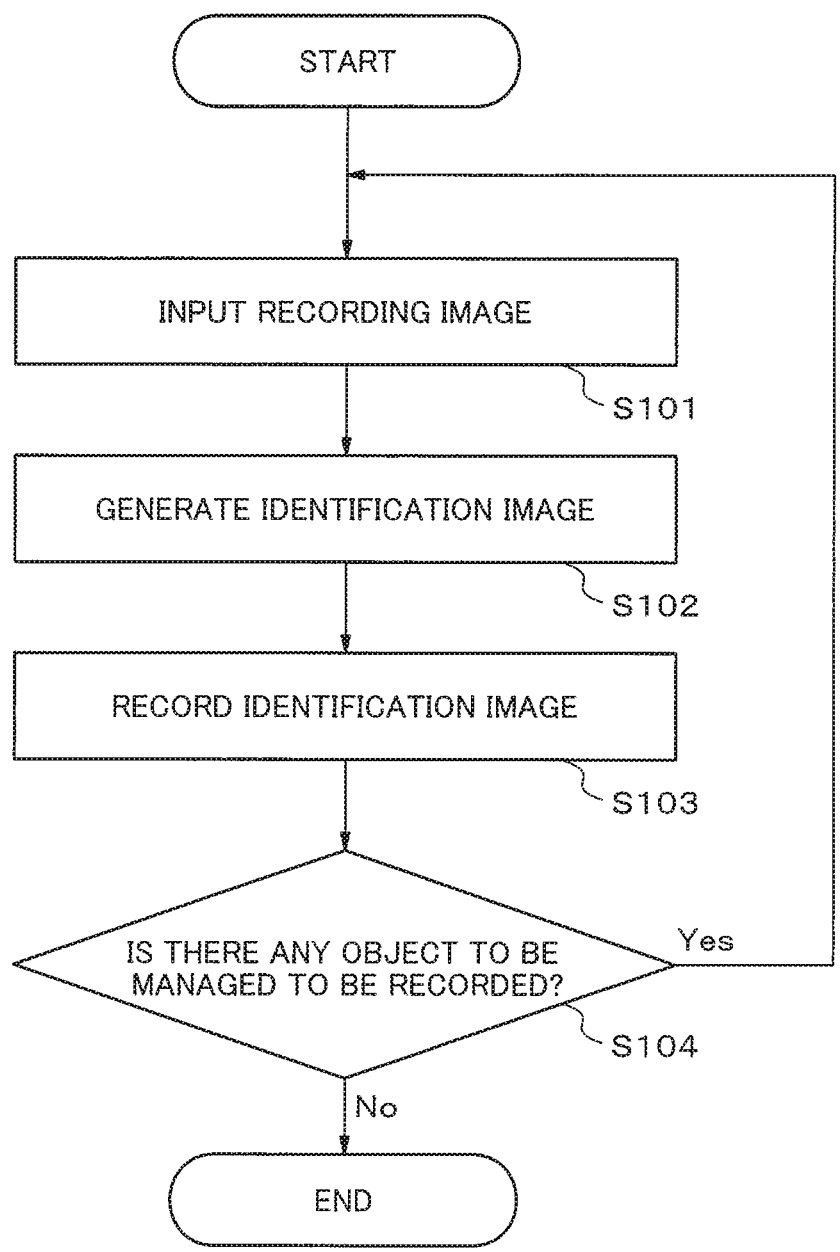
FIG. 3 is a flowchart illustrating an example of a list production operation of a management system of a first exemplary embodiment.

FIG. 3 is a flowchart illustrating an example of the list production operation of the management system of the present exemplary embodiment. As illustrated in FIG. 3, firstly, the recording image input unit 12 inputs a recording image obtained by capturing an identifying part of an object to be managed (step S101).

Next, the identification image generating unit 14 detects an identifying part from the inputted recording image, and generates an identification image in which the detected identifying part has been expressed at a predetermined orientation and size in an image region (step S102).

Next, the identification image recording unit 15 records the generated identification image in a list of objects to be managed as an identification image of a designated identification unit (step S103).

If there are objects to be managed to be additionally recorded, the procedure returns to step S101 and the aforementioned operations are repeated (Yes of step S104).

Figure 4:
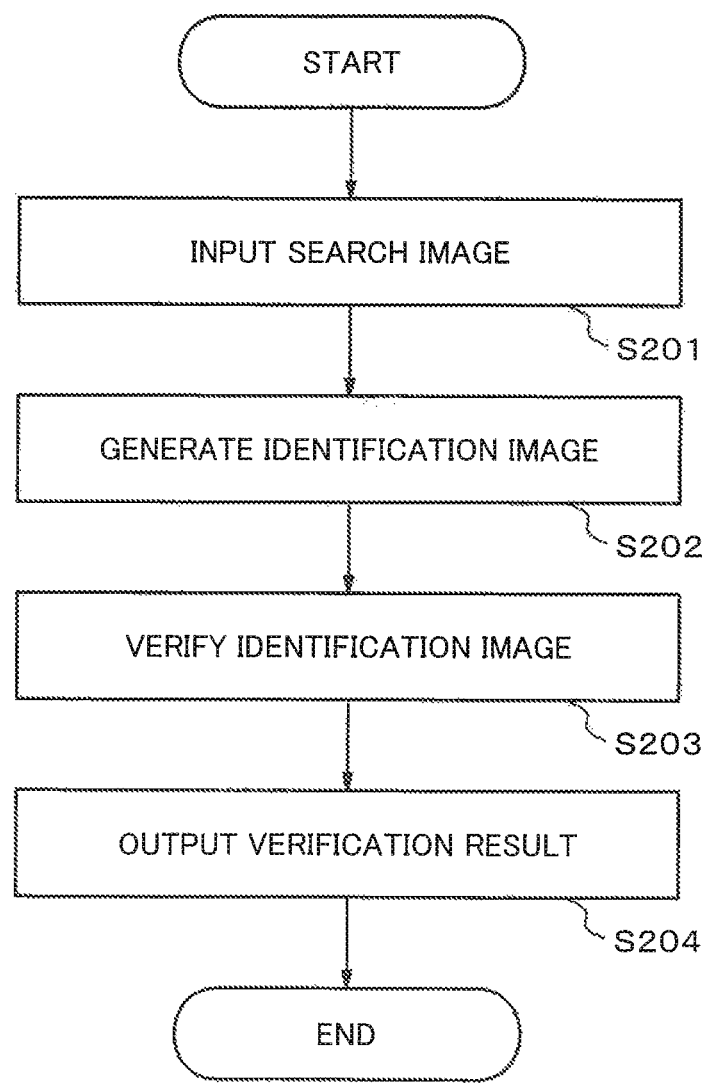
FIG. 4 is a flowchart illustrating an example of a list verification operation of a management system of a first exemplary embodiment.

FIG. 4 is a flowchart illustrating an example of the list verification operation of the management system of the present exemplary embodiment. As illustrated in FIG. 4, firstly, the search image input unit 13 inputs a search image obtained by capturing an identifying part of an object to be managed (step S201).

Next, the identification image generating unit 14 detects an identifying part from the inputted search image, and generates an identification image in which the detected identifying part has been expressed at a predetermined orientation and size in an image region (step S202).

Next, the identification image verification unit 16 uses the generated identification image as a key image and verifies the key image against each identification image recorded in the list of objects to be managed (step S203). Then, the identification image verification unit 16 outputs a verification result (step S204).

As described above, in the management system of the present exemplary embodiment, an identification image expressed at a predetermined orientation and size is generated both during list recording and during list verification, and one of the generated images is maintained while the other of the generated images is used for verification against the maintained image. Consequently, according to the management system of the present exemplary embodiment, it is possible to achieve sufficient identification performance and reduce labor and processing load required during the list production and the list verification. This is because when a user simply captures an identifying part of an object to be managed that the user desires to be recorded in a list, an identification image serving as a substitute of an identification code is automatically recorded in the list, and when a user simply captures an identifying part of an object to be managed that the user desires to verify, verification with the list is automatically performed.

The management system of the present exemplary embodiment, which uses an image recognition processing for list verification, can cope with a free format. Furthermore, an identification image is stored as an image easily recognizable to the human eye (an image which does not include few extra things such as a background and has a fixed orientation), and therefore a list is easily recognized when displayed, resulting in an enhanced operability. Furthermore, there is another advantage in that, in case of a lost object to be managed, an identification image can give a clue to a person in search of the lost object.

Figure 5:
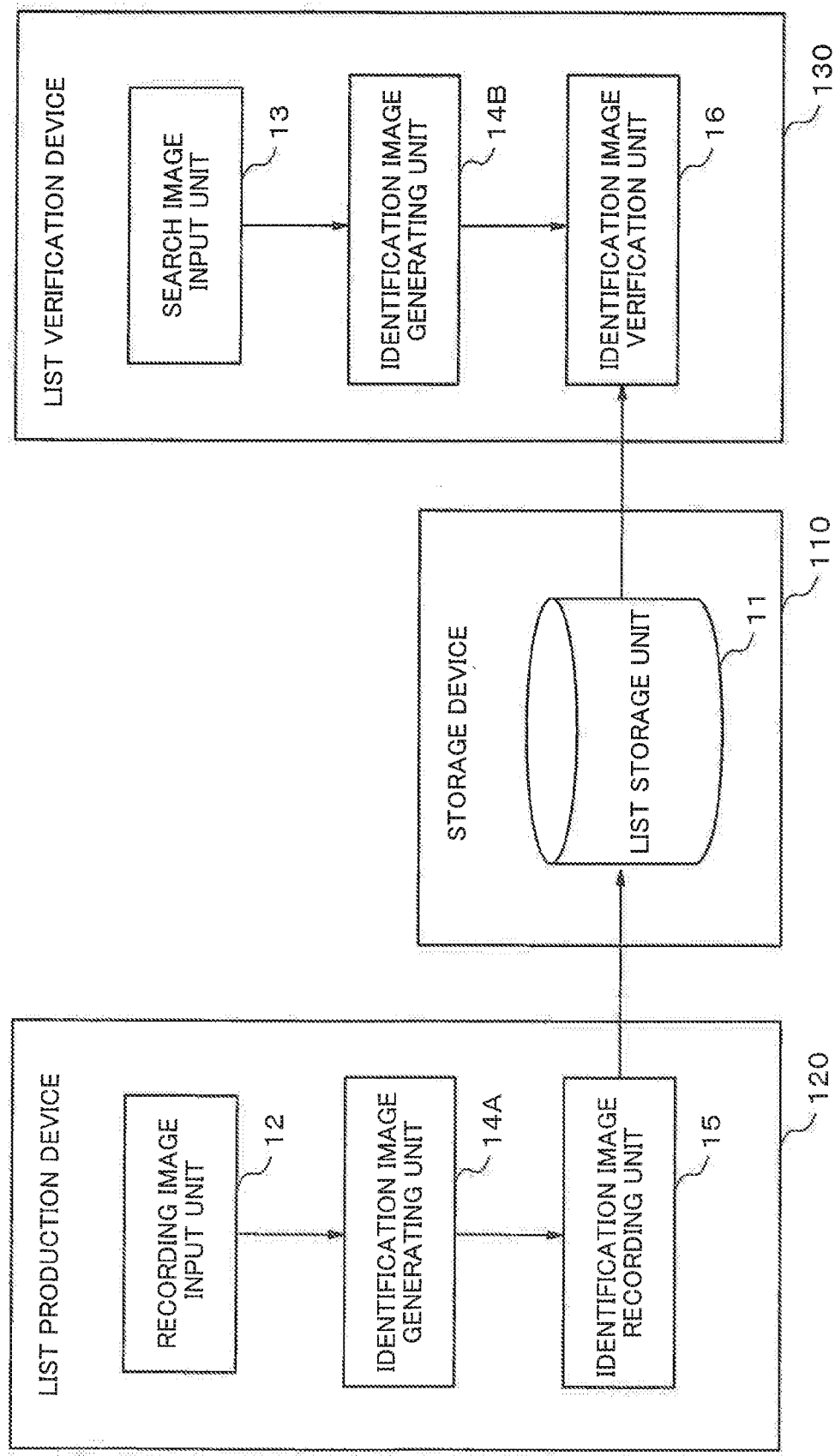
FIG. 5 is a block diagram illustrating another configuration example of a management system of a first exemplary embodiment.

FIG. 1 illustrates an example in which all the elements are mounted in one device; however, as illustrated in FIG. 5, the elements may be separately mounted in two or more devices. FIG. 5 is a block diagram illustrating another configuration example of a management system of the present exemplary embodiment. The management system illustrated in FIG. 5 includes a storage device 110, a list production device 120, and a list verification device 130. In the present example, the storage device 110 includes a list storage unit 11. The list production device 120 includes a recording image input unit 12, an identification image generating unit 14A, and an identification image recording unit 15. The list verification device 130 includes a search image input unit 13, an identification image generating unit 14B, and an identification image verification unit 16.

In the example illustrated in FIG. 5, the identification image generating unit 14A and the identification image generating unit 14B generate identification images with the same orientation and the same size by using a method decided in advance in the case of at least the same identification unit. The identification image generating unit 14A and the identification image generating unit 14B may be realized, for example, by the same functional modules. Furthermore, for example, instead of including the identification image generating unit 14A and the identification image generating unit 14B in each device, a configuration with a predetermined server may be employed, wherein the server includes the identification image generating unit 14 and a request may be made to the server to perform processing for obtaining identification images.

Second Exemplary Embodiment

Figure 6:
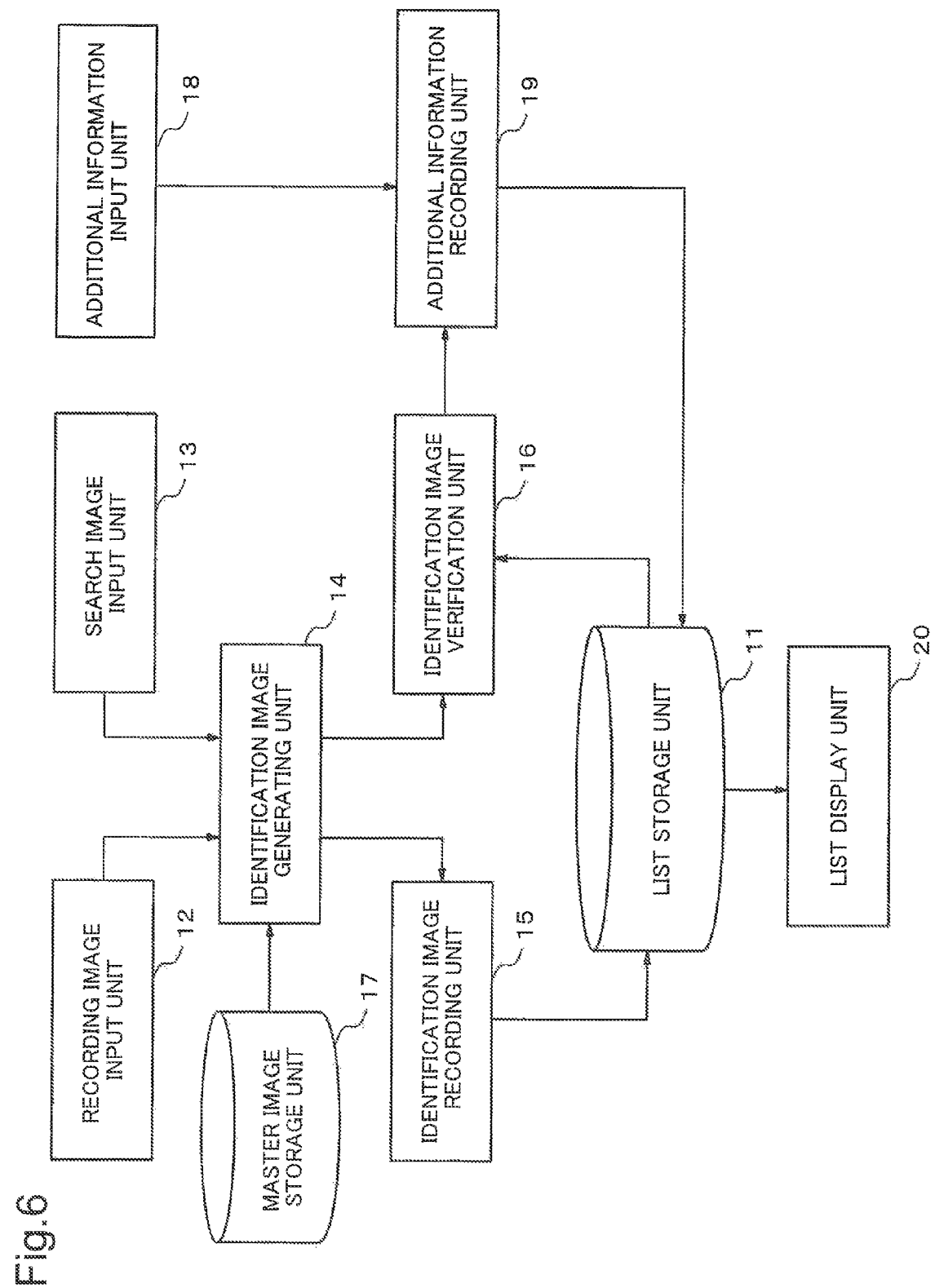
FIG. 6 is a block diagram illustrating a configuration example of a management system of a second exemplary embodiment of the present invention.

Next, a second exemplary embodiment of the present invention will be described. FIG. 6 is a block diagram illustrating a configuration example of a management system of the second exemplary embodiment. The management system illustrated in FIG. 6 is different from the first exemplary embodiment illustrated in FIG. 1 in that it further includes a master image storage unit 17, an additional information input unit 18, an additional information recording unit 19, and a list display unit 20.

The master image storage unit 17 stores a master image. The master image is an image for detecting an identifying part from an input image as described above, and is an image expressing the characteristics of the identifying part. For example, if the identifying part is a printed label, the master image may be an image obtained by capturing an unwritten printed label. If the identifying part is a face, the master image may be an image expressing a general "face" (for example, an image obtained by statistically processing and averaging facial images of a plurality of persons, and the like). There may be more than one master image. It should be noted that, since the identification image is used for determining objects to be listed (objects to be managed) and the master image is used for determining whether objects are objects to be listed (objects to be managed), their roles are different from each other.

The master image stored in the master image storage unit 17 is used in a trimming processing, an enlargement•reduction processing, a rotation processing, and an inclination correction processing for the input image in the identification image generating unit 14.

The additional information input unit 18 inputs additional information which is information to be recorded in a list of objects to be managed in association with identifiers in addition to identification images. The additional information recording unit 19 records the additional information input by the additional information input unit 18 in the list of objects to be managed as additional information of a designated identification unit. The designation of the identification unit may be inputted by a user together with the input of the additional information, or when the additional information is inputted subsequently to the recording of the identification image, the designation may be taken over in a recording image. The verification result of the identification image may also be used.

Additional information may include any information regarding an object to be managed. The additional information may be, for example, information indicating the state of an object to be managed or when there is more than one object to be managed, the additional information may indicate the number of objects to be managed. When the additional information is applied to a distribution system, the additional information may be information indicating transport situations such as the presence or absence of an arrival and an arrival date in each check point. The information indicating transport situations may be, for example, an identification image (a key image) generated from a search image in each check point. When the key image has been recorded as the information indicating transport situations, verification errors, if they occur, can be easily identified later.

The additional information may include information indicating the content of an object to be managed. The information indicating the content may be an image obtained by capturing the content or characters and the like indicating the content (hereinafter, referred to as a "content image").

In order to automatically extract the content image, for example, a printed label and the like for writing characters and the like indicating the content in each object to be managed may be provided. In such a case, a master image for detecting the printed label may be prepared. A label indicating the content or an image and the like obtained by capturing the content may be attached in a preset frame and the like on each object to be managed, to be captured by a fixed camera.

As described above, separately from an identification image serving as a key image for search, a content image, by which a user may recognize an object to be managed, recorded as an attached image facilitates confirmation work of a user. Note that the attached image is a general term for images recorded in association with identifiers, other than the identification image, and is not limited to the content image as long as it is an image expressing information on an object to be managed. Similarly to the identification image, according to a holding configuration using an image format, a user may record data through simple capturing so that manual input labor is reduced.

The list display unit 20 appropriately displays the recording content of the list of objects to be managed stored in the list storage unit 11. The list display unit 20, for example, generates a list display screen for displaying the recorded content of the list and presents the recorded content of the list of objects to be managed to a user.

The list display screen may include, for example, an area for displaying a list of identification images of each identifier together with additional information, if any. When there are many images, a scroll function may be provided.

The list display unit 20 may provide a user with a recording screen and a search screen in addition to the list display screen. The recording screen and the search screen may be generated and displayed by the identification image recording unit 15 or the identification image verification unit 16.

The recording screen may include, for example, a preview area for capturing an identifying part, a preview area of a generated identification image, a button for instructing capturing, a simple display area for simply displaying the content currently recorded in a list, and a button for designating a distinction of an identification unit. Herein, the distinction of the identification unit indicates, for example, proceeding to processing of a next identification unit. The recording screen may further include a preview area for capturing an attached image. Herein, the preview area for capturing is an image for displaying an image in cooperation with an image means. The preview area is an area for allowing a user to confirm an object to be processed, and is an area for displaying an image serving as an object to be processed.

The search screen may include, for example, a preview area for capturing a search image, a preview area of an identification image generated from the search image, a button for instructing verification, a specified element display area for displaying a list element recognized as a verification result, and a button for instructing the recording of designated additional information with respect to the list element displayed in the specified element display area.

The search screen may include, for example, the following elements.

Preview area for capturing search image

Preview area of identification image generated from search image

Button for instructing verification

Specified element display area for displaying list element recognized as verification result Button for instructing recording of designated additional information with respect to list element displayed in specified element display area The specified element display area may include an area for displaying the attached image, particularly, the content image, as well as an area for displaying the identification image of the recognized list element. A key image which is an identification image detected from an input image, a recording identification image which is an identification image in a list recognized as the verification result, and an attached image associated with the recording identification image are simultaneously displayed, facilitating human recognition of verification results. That is, it is possible to compare the key image with the recording identification image by the human eye and when there is an error in a recognition result, a user is able to correct the recognition result. The content image is also displayed as well as the recording identification image, so that it is possible to know the content when the content of an object to be managed is not seen. Consequently, objects and the like are easily treated, resulting in the improvement of convenience.

In the present exemplary embodiment, the master image storage unit 17 is realized, for example, by a storage device. The additional information input unit 18 is realized, for example, by an imaging means, an input device capable of inputting image data, or an interface unit for inputting information from such an input device. The additional information input unit 18 is realized, for example, by an imaging means, an input device capable of inputting image date and other information, such as a mouse, a keyboard, and a touch panel, or an interface unit with an external device including such an input device. The additional information recording unit 19 is realized, for example, by an information processing device such as CPU, operating according to a program. The list display unit 20 is realized, for example, by an output device (including a display device) capable of outputting screen information, such as a display and a printer, an interface unit with an external device including such an output device, or an information processing device such as CPU, operating according to a program.

Figure 7:
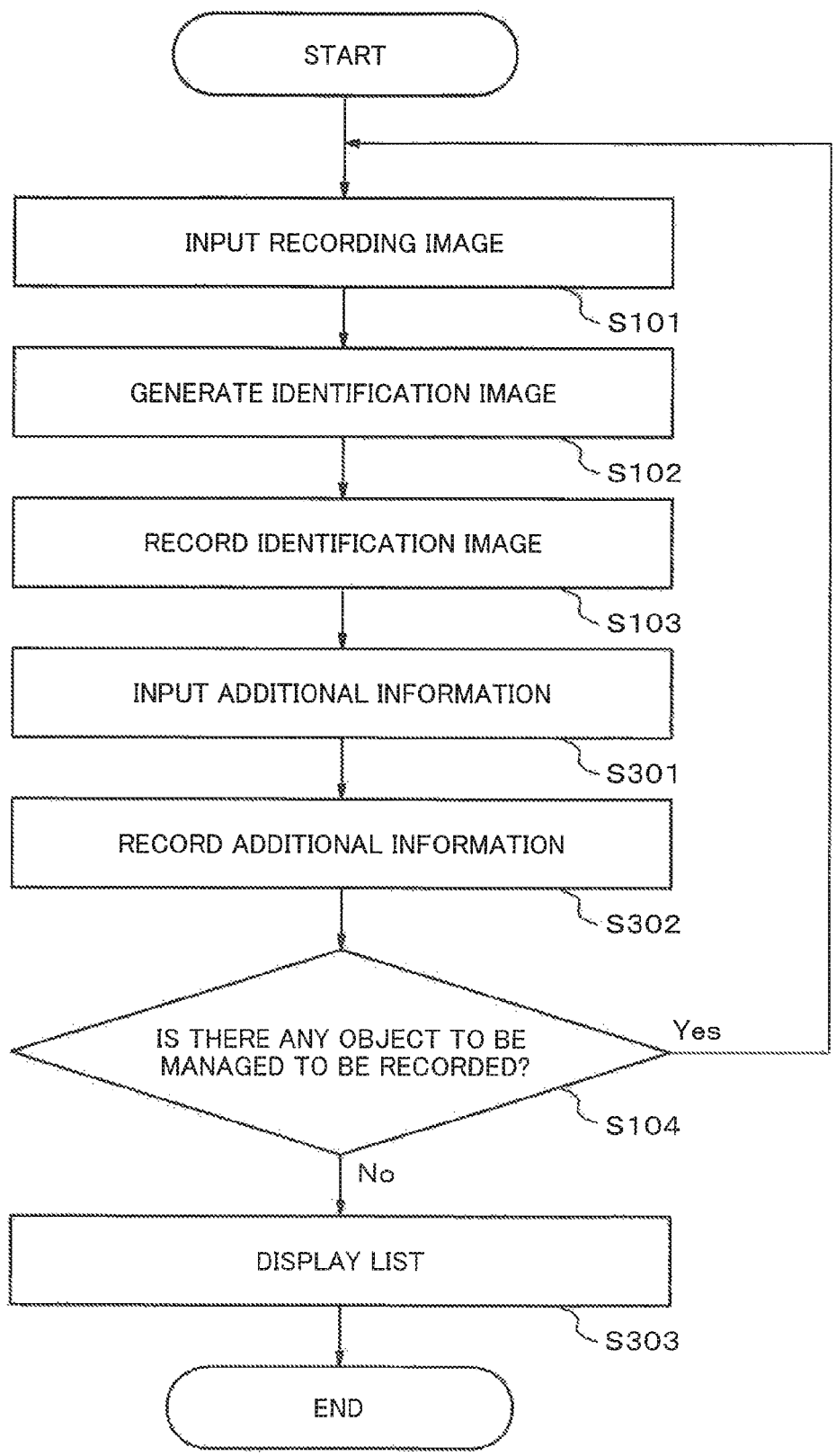
FIG. 7 is a flowchart illustrating an example of a list production operation of a management system of a second exemplary embodiment.

Next, the operation of the management system of the present exemplary embodiment will be described. The operation of the management system of the present exemplary embodiment is also largely classified into a list production operation and a list verification operation. Firstly, the list production operation will be described. FIG. 7 is a flowchart illustrating an example of the list production operation of the management system of the present exemplary embodiment. Processes similar to those of the first exemplary embodiment are denoted by the same step numbers, and a description thereof will be omitted.

As illustrated in FIG. 7, in the present exemplary embodiment, the additional information input unit 18 receives input of additional information from a user subsequently to the recording process of the identification image in step S103 (step S301). The input of the additional information may be received at any time, not only after the recording process of the identification image.

When the additional information is inputted, the additional information recording unit 19 records the inputted additional information in a list of objects to be managed as additional information of a designated identification unit (step S302).

If there are other objects to be managed to be recorded, the procedure returns to step S101 and the aforementioned operations are repeated (Yes of step S104).

If there are no other objects to be managed to be recorded (No of step S104), the list display unit 20 generates a list display screen and displays the recording content of the list of objects stored in the list storage unit 11 (step S303). Even when there are other objects to be managed to be recorded, the list display unit 20 may generate the list display screen in response to a user's instruction and display the recording content of the list of objects stored in the list storage unit 11 at that time point.

Figure 8:
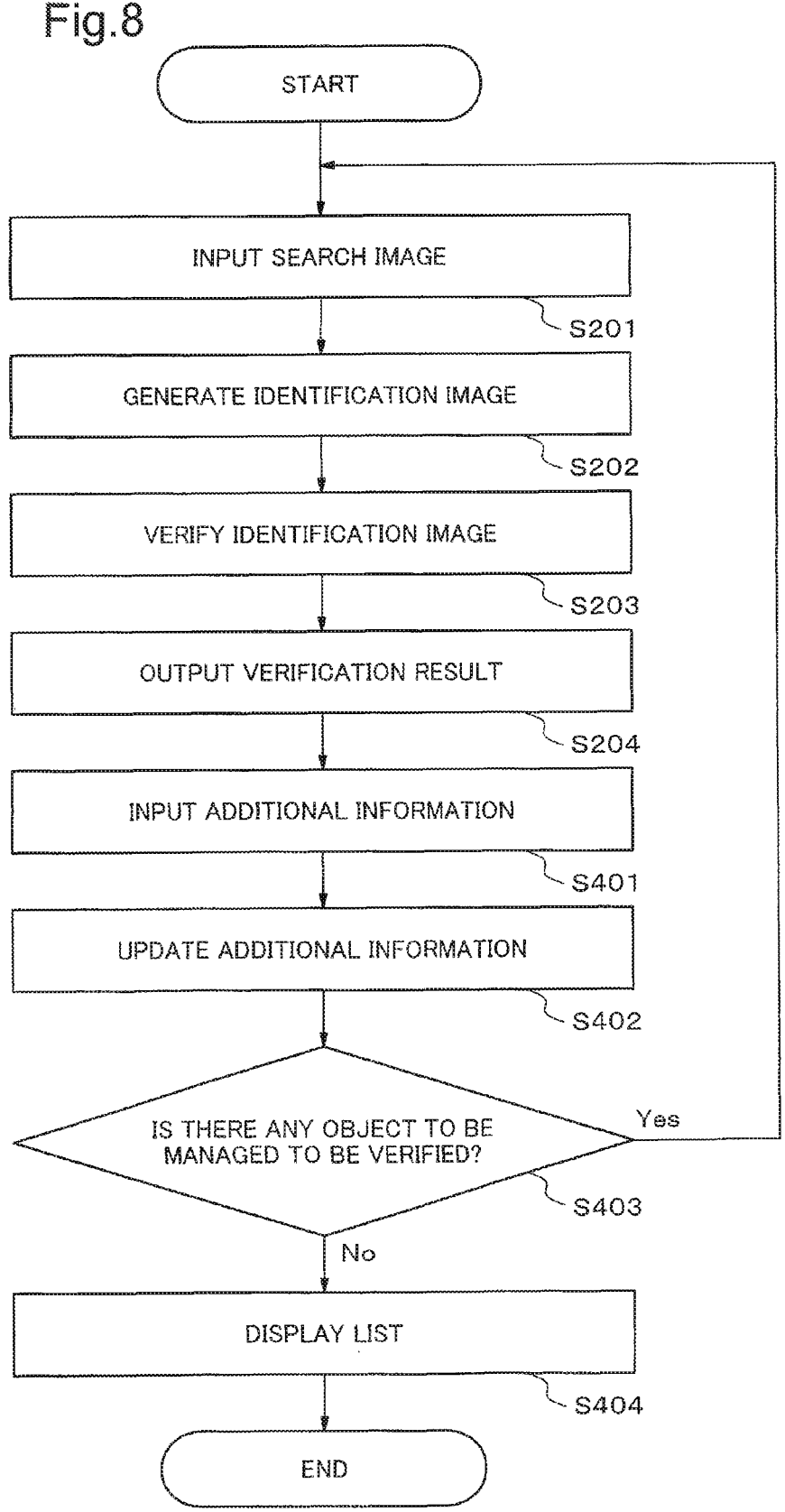
FIG. 8 is a flowchart illustrating an example of a list verification operation of a management system of a second exemplary embodiment.

Next, the list verification operation will be described. FIG. 8 is a flowchart illustrating an example of the list verification operation of the management system of the present exemplary embodiment.

In the example illustrated in FIG. 8, if the verification process of the identification image in step S204 is completed, the additional information input unit 18 receives input of the additional information from a user (step S401). The additional information input unit 18, for example, may receive input of information indicating transport situations at a check point together with information indicating the check point. The input of the additional information may be received at any time, not only after the verification process of the identification image. When a user confirms the verification result and it is OK, for example, the additional information input unit 18 may automatically input information (information indicating presence of an arrival, an arrival date and the like) indicating the confirmation OK as the information indicating the transport situations in the check point.

When the additional information is inputted, the additional information recording unit 19 records the inputted additional information in the list of objects to be managed as additional information of a designated identification unit or an identification unit specified as the verification result (step S402).

If there are other objects to be managed to be verified, the procedure returns to step S201 and the aforementioned operations are repeated (Yes of step S403).

If there are no other objects to be managed to be verified (No of step S403), the list display unit 20 generates a list display screen and displays the recording content of the list of objects stored in the list storage unit 11 (step S404). Even when there are other objects to be managed to be verified, the list display unit 20 may generate the list display screen in response to a user's instruction and display the recording content of the list of objects stored in the list storage unit 11 at that time point.

As described above, according to the present exemplary embodiment, it is possible to record the additional information subsequently to the recording or verification of the identification image, so that it is possible to reduce labor required during the list production and the list verification, in addition to the effects of the first exemplary embodiment. Furthermore, the attached image (particularly, the content image) is recorded as the additional information, so that it is possible to provide a list easily recognizable to the human eye. Furthermore, when a key image used in verification has been recorded as information indicating transport situations, it is possible to correct verification errors later.

Figure 9:
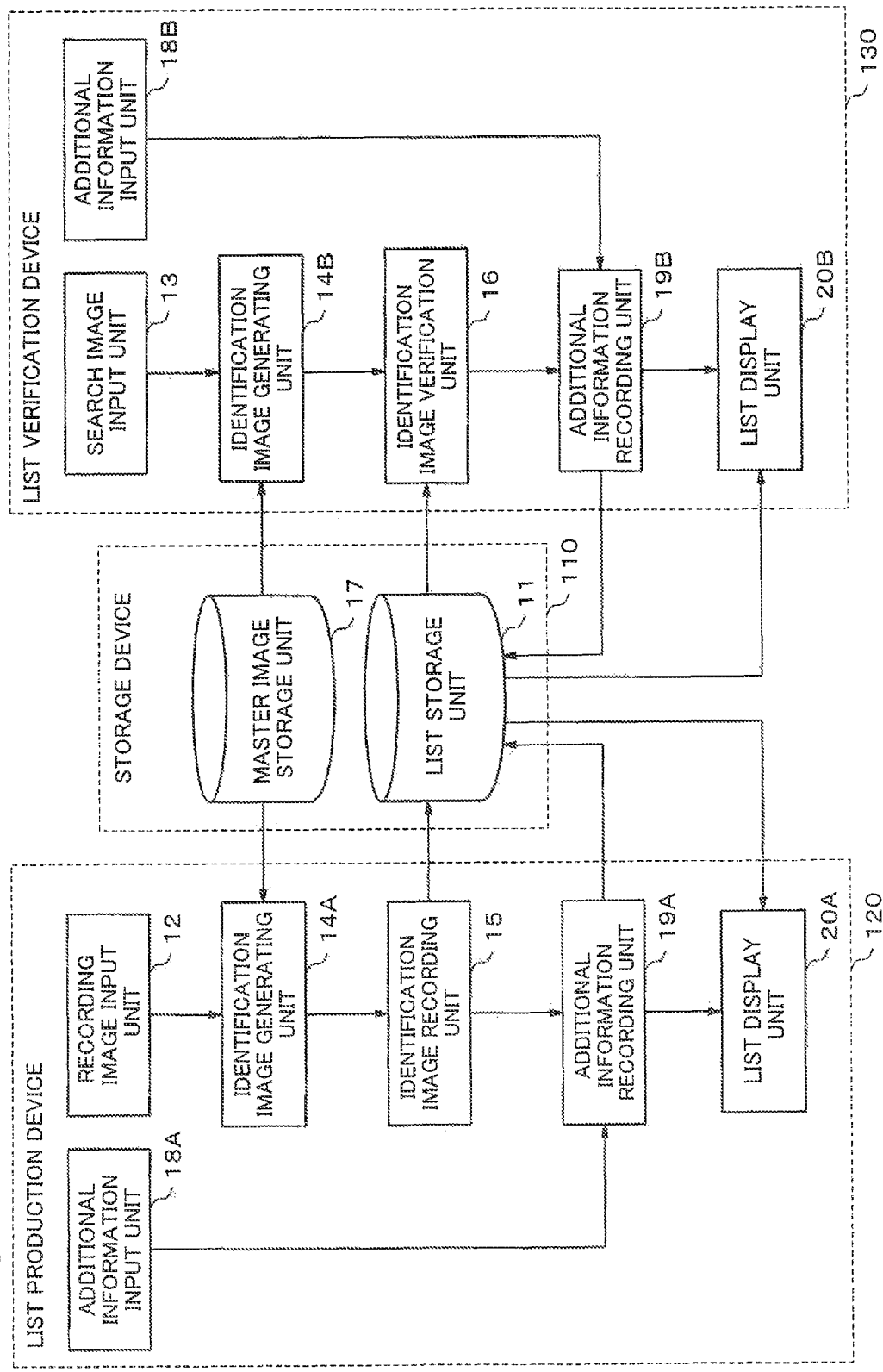
FIG. 9 is a block diagram illustrating another configuration example of a management system of a second exemplary embodiment.

FIG. 6 illustrates an example in which all the elements are mounted in one device (for example, a personal computer, a tablet terminal and the like); however, also in the present exemplary embodiment, the elements may be separately mounted in two or more devices. FIG. 9 is a block diagram illustrating another configuration example of the management system of the present exemplary embodiment. The management system illustrated in FIG. 9 is different from the configuration illustrated in FIG. 5 in that the storage device 110 further includes the master image storage unit 17. the management system illustrated in FIG. 9 is different from the configuration illustrated in FIG. 5 in that the list production device 120 further includes an additional information input unit 18A and an additional information recording unit 19A and the list verification device 130 further includes an additional information input unit 18B and an additional information recording unit 19B. Note that the master image storage unit 17 may be similar to the above-described master image storage unit 17. The additional information input units 18A and 18B also may be similar to the above-described additional information input unit 18. The additional information recording units 19A and 19B also may be similar to the additional information recording unit 19.

Third Exemplary Embodiment

Figure 10:
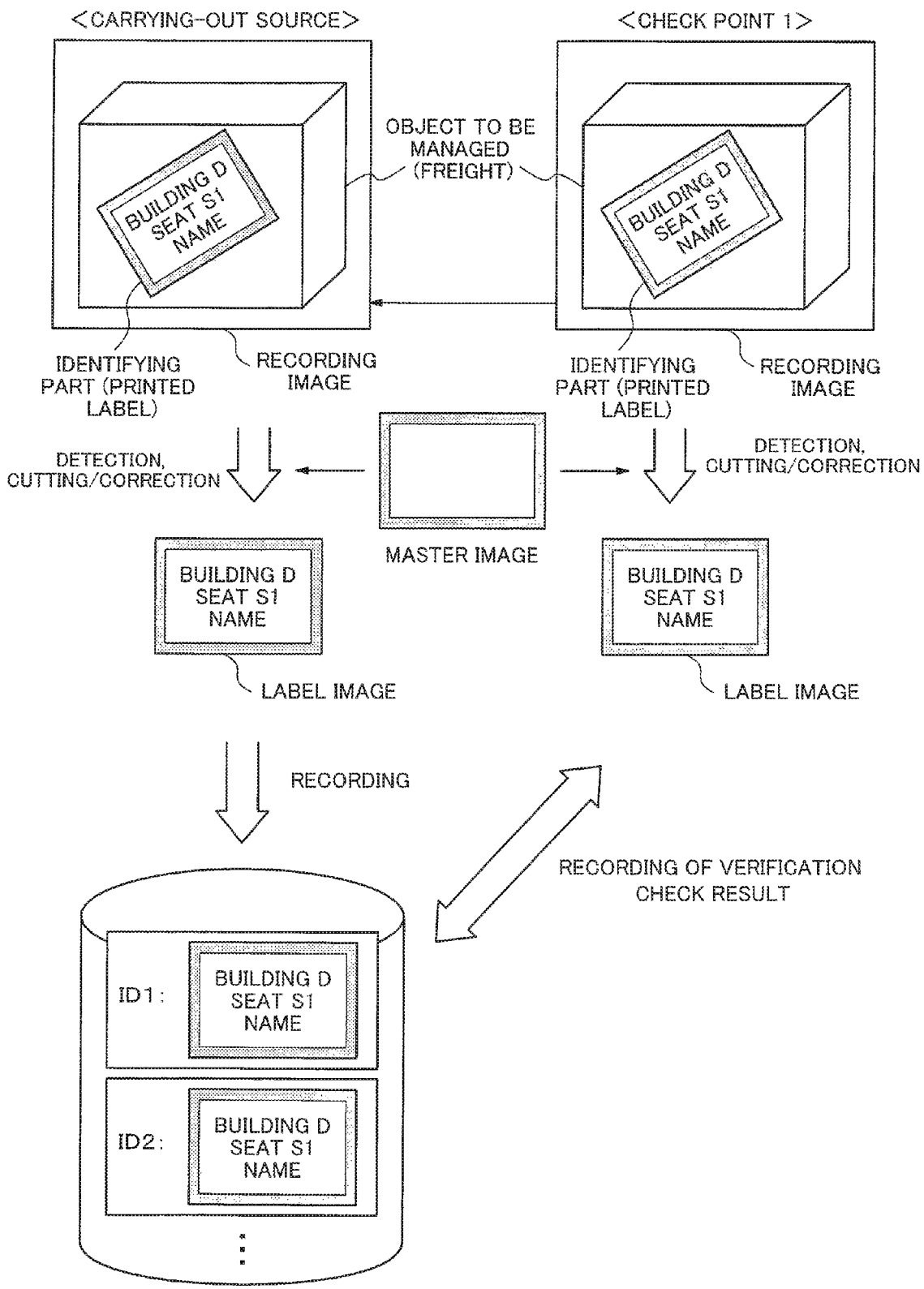
FIG. 10 is an explanation diagram illustrating an outline of a list production process and a list verification process in a third exemplary embodiment of the present invention.

Next, a third exemplary embodiment of the present invention will be described. Hereinafter, the following description will be provided for an example in which, in a distribution system for moving of an office, the present invention has been applied to a management system for managing packages to be transported (a corrugated cardboard and the like in which a computer and the like are packed). FIG. 10 is an explanation diagram illustrating an outline of a list production process and a list verification process performed by the management system of the present exemplary embodiment. As illustrated in FIG. 10, objects to be managed in the present exemplary embodiment are packages to be transported. An identifying part is a printed label provided to the packages to be transported. In the printed label, a destination and the like of the packages are written. The package items and the writing of the printed labels correspond to each other in a one-to-one manner. That is, in the present exemplary embodiment, identification units of the objects to be managed are the objects to be managed (individual objects). A method, in which the package items and the printed labels correspond to each other in a one-to-one manner, for example, includes a method in which an identification number and the like are further written on package items having the same destination, that is, the identification number and the like are handwritten on the printed label, and the like.

Figure 11:
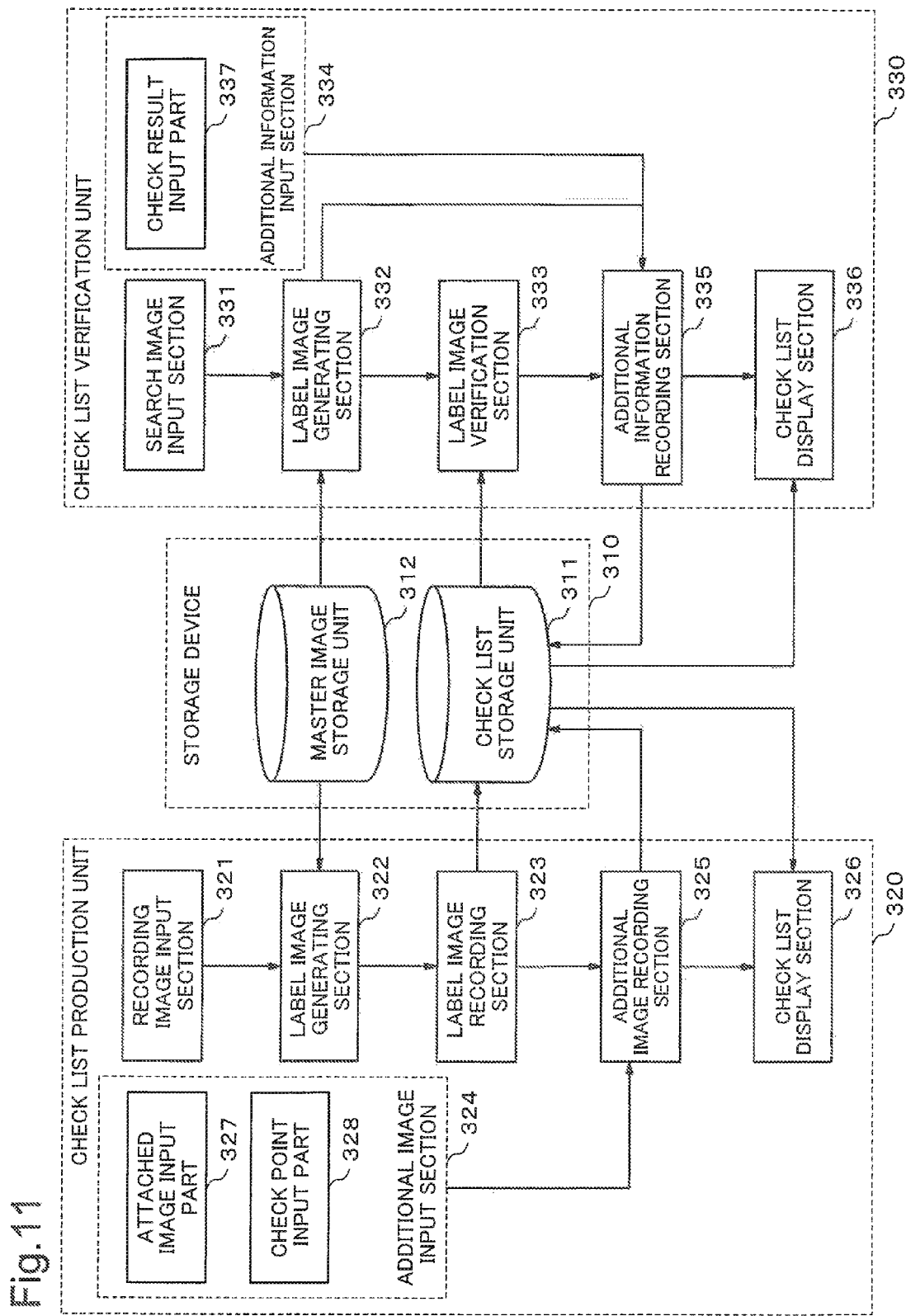
FIG. 11 is a block diagram illustrating a configuration example of a management system of a third exemplary embodiment.

FIG. 11 is a block diagram illustrating a configuration example of the management system of the present exemplary embodiment. The management system illustrated in FIG. 11 includes a storage device 310, a check list production unit 320, and a check list verification unit 330.

The storage device 310 includes a check list storage unit 311 and a master image storage unit 312.

The check list storage unit 311 is a part corresponding to the above-described list storage unit 11, and allows a unique ID to correspond to each package item and stores a label image corresponding to an identification image for identifying the package item and a check list of the package in which additional information is recorded.

The additional information includes at least a content image obtained by capturing the content of the package, the presence or absence of an arrival and an arrival date at each check point, and a label image used as a key image. The check point is a carrying-out source, a halfway point, a destination and the like.

The master image storage unit 312 is a part corresponding to the above-described master image storage unit 17 and stores a master image which is an image for detecting a printed label from an input image and is an image expressing characteristics of the printed label. In the present exemplary embodiment, a printed label provided to each package item is common and an image obtained by capturing the printed label from the front side in an unwritten state is used as a master image.

The check list production unit 320 includes a recording image input section 321, a label image generating section 322, a label image recording section 323, an additional information input section 324, an additional image recording section 325, and a check list display section 326.

The recording image input section 321 is a part corresponding to the above-described recording image input unit 12. The recording image input section 321 inputs a recording image obtained by capturing a printed label of packages to be transported, for example, in a carrying-out source. The recording image input section 321, for example, controls an imaging means or takes image data in response to a user operation, thereby inputting a recording image which includes the printed label of packages to be transported as part of the captured image. At this time, the recording image input section 321 may display a label capturing screen and the like for providing a capturing function for capturing the printed label, thereby providing a user with an interface for capturing the printed label.

The label image generating section 322 is a part corresponding to the above-described identification image generating unit 14. Based on the master image stored in the master image storage unit 312, the label image generating section 322 detects a printed label from the inputted recording image and generates a label image expressing the detected printed label at a predetermined orientation and size. In the present exemplary embodiment, the label image generating section 322 generates a label image in which the printed label included in the recording image has been expressed at the same orientation and size as those of the printed label displayed in the master image. When the orientation and the size of the printed label included in the recording image are not equal to those of the printed label, the label image generating section 322 performs a trimming process, an enlargement•reduction process, a rotation processing, and an inclination correction processing with respect to the input image.

A method for detecting a label area from an input image may be, for example, to detect the label area by comparing a combination of feature points extracted from the image with that of the master image. For example, a correspondence relations of feature points obtained from an image, such as SIFT (Scale-Invariant Feature Transform) feature points, SURF (Speeded Up Robust Features) feature points, and corner feature points may be used. As a detailed example, a method disclosed in a pamphlet of International Publication No. 13/089004 or a method disclosed in a description of U.S. Pat. No. 6,711,293 may be used. For example, the pamphlet of International Publication No. 13/089004 discloses an example of a local feature point based method. By using the local feature point based method, the label image generating section 322, for example, may acquire a local area in which a feature amount is extracted from information on feature points extracted from an image, and generate a feature vector with respect to a sub-area obtained by dividing the acquired local area. Then, the label image generating section 322 verifies the feature vector thus generated from the input image against a feature vector generated from the master image, thereby obtaining the correspondence relation of the feature points. Then, by using the obtained correspondence relation of the feature points, the label image generating section 322 obtains parameters regarding geometric transformation between the master image and the input image and detects a label area of the input image from the obtained parameters and the master image.

Furthermore, for example, when the printed label is rectangular in shape, the label area may be detected by using the shape of the printed label. More specifically, the generalized Hough transform may be used. Furthermore, by detecting four straight lines with the Hough transform and detecting the area surrounded by the four straight lines, the master image may be omitted. Alternatively, the label area may be detected by detecting a special mark printed in advance on the printed label.

A method for obtaining an inclination correction amount may be, for example, to obtain the inclination correction amount by comparing the master image with the input image and obtaining the label area and a position correction parameter (the above-described geometric transformation parameter and the like). The inclination may also be corrected by, for example, comparing an image in the detected label area with information for designating a "correct orientation". Furthermore, for example, the inclination correction amount may be obtained by comparing a combination of feature points extracted from an image with a combination of feature points extracted from a master image recorded in the "correct orientation" in advance. Furthermore when the printed label is rectangular, for example, the shape of the printed label may be used. That is, the printed label may be rotated such that the rectangular sides are placed horizontally or vertically. Alternatively, a special mark capable of specifying an orientation may be printed on a label and the inclination correction amount may be obtained based on the inclination of the mark. In addition, by printing a similar special mark on the master image, the inclination correction amount may be obtained by comparing the degree of inclination of the mark with that of the mark on the label. Based on the correction amount obtained in such a manner, the inclination of an input image (particularly, a predetermined image region including the label area) is corrected.

FIG. 10 illustrates the example in which the label area is cut from the input image and an image corrected at a correct orientation is generated as the label image. However, for example, as illustrated in (a) of FIG. 12, an image including a peripheral part that surrounds a printed label may be generated as the label image. As illustrated in (b) of FIG. 12, a partial image obtained by cutting out a rectangular area that circumscribes a printed label and is taken at a correct orientation predetermined relative to the package item may also be generated as the label image. By including in the label image a part of a package item or orientation information of the printed label relative to the package item, it is possible to enhance the identifiability of the label image.

The label image recording section 323 is a part corresponding to the above-described identification image recording unit 15. The label image recording section 323 records the label image, which has been generated from the recording image by the label image generating section 322, in a check list as an identification image of a designated identification unit in response to a recording instruction from a user. In the present exemplary embodiment, a new ID is assigned whenever the label image is recorded.

The additional information input section 324 is a part corresponding to the above-described additional information input unit 18, and, in the present exemplary embodiment, includes an attached image input part 327 and a check point input part 328.

The attached image input part 327 inputs an attached image as additional information. For example, the attached image input part 327 controls an imaging means or takes image data in response to a user operation, thereby inputting a content image obtained by capturing the content of packages, characters indicating the content and the like. At this time, the attached image input part 327 may display a content image capturing screen for providing a capturing function for capturing the content, thereby providing a user with an interface for capturing the content image.

The attached image input part 327 may also have a function of detecting and cutting an area (a content area) expressing the content of packages from an inputted image. The attached image input part 327, for example, may detect a second printed label written with a character and the like indicating the content by using a method similar to a method for detecting a printed label serving as an identifying part.

The check point input part 328 inputs, as additional information, information indicating a location to be checked (a check point). The check point input part 328, for example, prepares a check point selection screen and the like, allows a user to select the location to be checked (the check point) from a plurality of locations set in advance, and inputs a selection result.

The additional image recording section 325 is a part corresponding to the above-described additional information recording unit 19, and records the additional information inputted via the additional information input section 324 in the check list as the additional information of the designated identification unit.

The check list display section 326 is a part corresponding to the above-described list display unit 20, and appropriately displays the recording content of the check list stored in the check list storage unit 311.

The check list verification unit 330 includes a search image input section 331, a label image generating section 332, a label image verification section 333, an additional information input section 334, an additional information recording section 335, and a check list display section 336.

The search image input section 331 is a part corresponding to the above-described search image input unit 13. The search image input section 331 inputs a search image obtained, for example, by capturing a printed label of a transported package at each check point. For example, the search image input section 331 controls an imaging means or takes image data in response to a user operation, thereby inputting a search image which includes the printed label of the transported package as part of the captured image. At this time, the search image input section 331 may display a label capturing screen and the like for providing a capturing function for capturing the printed label, thereby providing a user with an interface for capturing the printed label.

The label image generating section 332 is a part corresponding to the above-described identification image generating unit 14. Based on the master image stored in the master image storage unit 312, the label image generating section 322 detects a printed label from the inputted search image and generates a label image in which the detected printed label has been expressed at a predetermined orientation and size. The generation method of the label image is similar to that of the label image generating section 322.

The label image verification section 333 is a part corresponding to the above-described identification image verification unit 16. When the search image has been inputted, the label image verification section 333 uses the label image generated from the search image as a key image, verifies the key image against each label image recorded in the check list, and outputs a verification result.

The label image verification section 333 of the present exemplary embodiment has a verification function of determining whether a label image obtained from an image captured at a certain place and a label image obtained from an image captured at another place coincide with each other. More specifically, the label image verification section 333 calculates the degree of coincidence between the key image and each label image recorded in the check list, and performs the determination based on each degree of coincidence so calculated. Instead of verifying the key image against the label image, the label image verification section 333 may determine the degree of coincidence by comparing a predesignated area (for example, a user writing area, which will be described later) of the key image with a predesignated area (for example, a user writing area, which will be described later) of the label image. For assessing degrees of coincidence of label images, it is preferable to preferentially use a method in which images are compared at signal levels, such as a difference between images and a normalized function. Furthermore, by means of the arrangement of characters, a character image verification technology of verifying a character string image may also be used. For example, a character image verification technology disclosed in a pamphlet of International Publication No. 10/053109 may be used. The pamphlet of International Publication No. 10/053109 discloses a method for determining the degree of coincidence between a prerecorded image and an image (a key image) used in search query relying on the arrangement of connection areas obtained after binarization. The connection area is a set of areas in a binary image.

A character recognition processing may also be performed for both images to be verified. In such a case, text-based comparison may be performed based on a character recognition result. Furthermore, when barcodes are included in the images to be verified, texts resulting from reading the barcodes may be compared with each other.

The additional information input section 334 is a part corresponding to the above-described additional information input unit 18, and includes a check result input part 337 in the present exemplary embodiment.

The check result input part 337 inputs, as additional information, information (information indicating the presence of an arrival, an arrival date and the like) indicating transport situations at a check point together with information indicating the check point.

When packages in the list has been specified as a result of the verification by the label image verification section 333, the check result input part 337 may automatically input information indicating that "confirmation OK" as information on the transport situations at the check point with respect to the package. The information indicating "confirmation OK" includes, for example, information indicating the presence of an arrival, an arrival date and the like. Whether the package has been specified can be determined according to whether all but one candidate elements in the list have been eliminated or according to a confirmation result by a user, of a verification result.

Furthermore, when the package recognition result by the verification is not reliable, the check result input part 337 may cancel or correct the check result, or provide an interface through which a user can directly input the check result without image-based verification. When, for example, the information indicating the transport situations of packages at the check point has been already recorded in the list, the check result input part 337 may display the fact to a user.

The additional information recording section 335 is a part corresponding to the above-described additional information recording unit 19, and records the additional information inputted via the additional information input section 334 in the check list as additional information for a designated identification unit.

The check list display section 336 is a part corresponding to the above-described list display unit 20, and appropriately displays the recorded content of the check list stored in the check list storage unit 311. The check list display section 336 may display total results (progress situations and the like) obtained from the recorded content as well as the recorded content of the check list.

Figure 13:
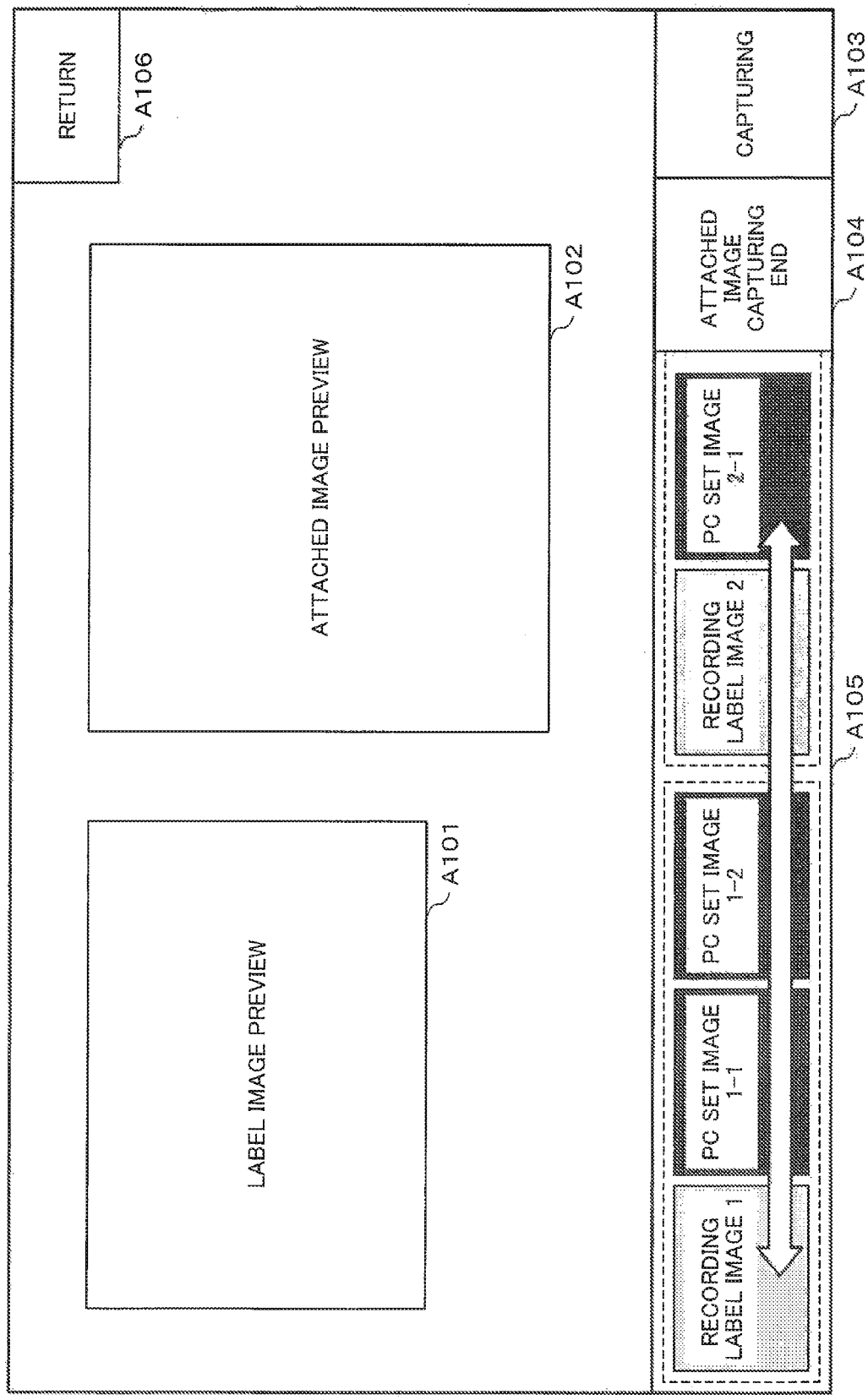
FIG. 13 is an explanation diagram illustrating an example of a recording screen.

FIG. 13 is an explanation diagram illustrating an example of the recording screen displayed by the recording image input section 321 or the additional information input section 324 (particularly, the attached image input part 327). The recording screen illustrated in FIG. 13 includes a label image preview area A101, an attached image preview area A102, a capturing button A103, an attached image capturing end button A104, a list image display area A105, and a return button A106.

The label image preview area A101 (hereinafter, simply referred to as a preview area A101) is a preview area for capturing a printed label and checking a generated label image. The preview area A101, in an initial state, serves as a preview screen of an imaging means. By pressing (or touching) the capturing button A103, capturing is performed. After the capturing, a label image is generated from a captured image (a recording image) and displayed on the preview area A101. Furthermore, by a capturing instruction for the preview area A101, the label image generated from the captured image is recorded in a new list.

The attached image preview area A102 (hereinafter, simply referred to as a preview area A102) is a preview area for capturing an attached image and checking a generated attached image, but nothing is displayed in the initial state. When the label image is generated and is displayed on the preview area A101, an attached image capturing mode is performed, so that the preview area A102 serves as a preview screen of the capturing means. By pressing the capturing button A103, capturing is performed. After the capturing, the preview area A102 serves as the preview screen of the imaging means for next capturing. By a capturing instruction for the preview area A102, a captured image is recorded in a list as an attached image of ID associated with a label image being displayed.

The capturing button A103 is a button for instructing capturing. The attached image capturing end button A104 is a button for instructing the end of the attached image capturing mode. By pressing the attached image capturing end button A104, the attached image capturing mode is ended and a label image capturing mode (an initial state) is performed.

The list image display area A105 is an area in which images (attached images in the case of label images) currently recorded in the check list are grouped for each ID and are displayed. As schematically indicated by an arrow in FIG. 13, the list image display area A105 can be horizontally scrolled, and an image or an image group being displayed can be selected (an arrow is used similarly in FIG. 14 and FIG. 15). When an image or an image group being displayed in the list image display area A105 is selected, a correction screen is displayed.

The return button A106 is a button for ending the screen currently displayed and for instructing a return to the previous screen or a screen of an upper layer.

FIG. 14 is an explanation diagram illustrating an example of the correction screen displayed by the recording image input section 321 or the additional information input section 324 (particularly, the attached image input part 327). The correction screen illustrated in FIG. 14 includes a label image preview area B101, an attached image preview area B102, a deletion button B103, a list image display area B104, and a return button B105.

The label image preview area B101 and the attached image preview area B102 (hereinafter, simply referred to as a preview area B101 and a preview area B102) display a label image and an attached image to be corrected. The correction object is an image that is selected in a list image display area of the correction screen or of the recording screen, which was displayed before the correction screen is displayed. For example, when a label image has been clicked in the list image display area, an image group having an ID associated with the label image is selected as the correction object. In such a case, the clicked label image and the attached image are displayed on the preview areas B101 and B102. When there are a plurality of attached images, a scroll function may be provided to the preview area B102. Furthermore, when, for example, an attached image has been clicked in the list image display area, the attached image is selected as the correction object. In such a case, the clicked attached image and a label image associated with the ID of the attached image are displayed on the preview areas B101 and B102. Furthermore, when the preview area B101 displaying the label image has been selected and made active, and the deletion button B103 has been pressed in this state, an entire ID is deleted from the list after the user is asked to confirm the action. When one of the preview area B102 displaying the attached image has been selected and made active, and the deletion button B103 has been pressed in this state, the attached image is deleted from the list after the user is asked to confirm the action.

The other screen elements are similar to those in the recording screen illustrated in FIG. 13.

FIG. 15 is an explanation diagram illustrating an example of the search•recording screen displayed by the search image input section 331 or the additional information input section 334 (particularly, the check result input part 337). The search•recording screen illustrated in FIG. 15 includes the following elements.

Search label image preview area C101
Recognition result display area C102
Capturing button C103
Check result input button C104
List image display area C105
Return button C106
Check result display area C107

The search label image preview area C101 (hereinafter, simply referred to as a preview area C101) is a preview area for capturing a printed label used as a key image and checking a generated label image. The preview area C101, in the initial state, serves as a preview screen of an imaging means. By pressing the capturing button C103, capturing is performed. After the capturing, a label image is generated from a captured image (a search image) and displayed on the preview area C101. By a capturing instruction for the preview area C101, the label image generated from the captured image is used as a key image and is verified against the list.

The recognition result display area C102 is an area for displaying a recognized identification image or a candidate identification image as a result of the verification, together with an attached image having an ID associated with the identification image. Sets of the identification images and the attached images are arranged for display, for example, in a descending order of the degree of coincidence. When a user has selected a label image in the list image display area C105, the selected identification image and an attached image having an ID associated with the identification image are displayed on the recognition result display area C102.

The check result input button C104 is a button for instructing the recording of a check result ("confirmation OK") with respect to the package having an ID associated with the identification image which is displayed on the recognition result display area C102. A check point with respect to which the check result will be displayed may be selected when the screen is moved on to a confirmation screen.

The check result display area C107 is an area for displaying a check result (including another check point) recorded in the list in relation to the package having an ID associated with the identification image being displayed on the recognition result display area C102.

The other screen elements are similar to those in the recording screen illustrated in FIG. 13. In the present example, a display order in the list image display area C105 may be a recognition order, that is, a descending order of the degree of coincidence.

FIG. 16 is an explanation diagram illustrating an example of the list display screen displayed by the check list display section 326 or by the check list display section 336. The list display screen illustrated in FIG. 16 includes an area D101 for displaying the recorded content of the check list and an area D102 for displaying total results (progress situations and the like) obtained from the recorded content. In the list display screen of the present example, when an image included in the area D101 is clicked, the displayed image is enlarged. With respect to check results at each check point, the check results may be canceled or may be corrected by manual input.

The illustrated various screens are for illustrative purposes only and the present invention is not limited thereto. Elements (buttons, areas for various types of display, and the like) included in each screen, and the configurations, positions and the like of areas may be appropriately changed.

Figure 17:
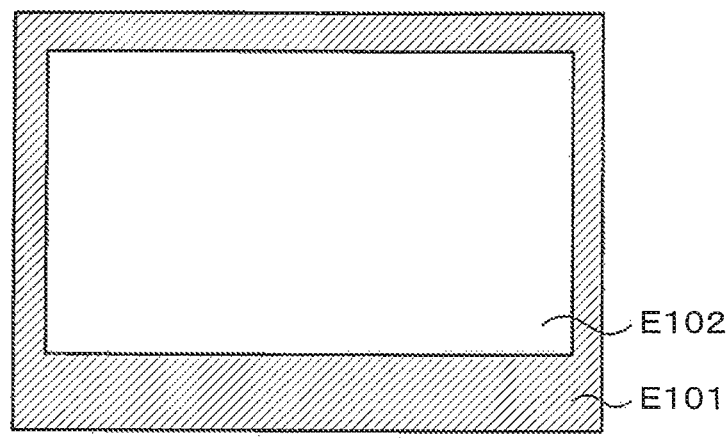
FIG. 17 is an explanation diagram illustrating a design example of a printed label.
Figure 18:
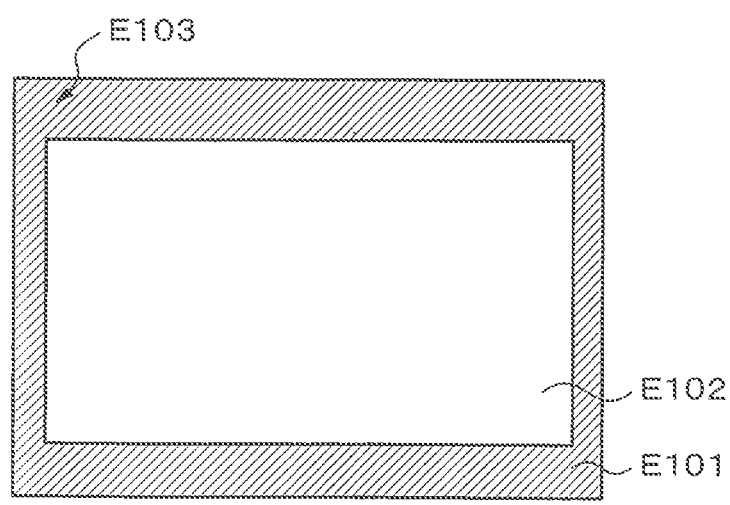
FIG. 18 is an explanation diagram illustrating a design example of a printed label.

Next, a printed label appropriate for the management system of the present invention will be described using the accompanying drawings. FIG. 17 and FIG. 18 are explanation diagrams illustrating design examples of the printed label. As illustrated in FIG. 17 and FIG. 18, preferably, the printed label includes an area E101 appropriate for extracting a label area and an area E102 appropriate for character image verification. Moreover, as illustrated in FIG. 17, it is preferable that the area E101 includes features that enable determination of an orientation, such as a lower side with a length greater than that of an upper end. Furthermore, as illustrated in FIG. 18, it is preferable that a constant design E103 is printed such that a local feature amount is easily extracted during the extraction of a label area. In the present example, the area E102 is a user writing area on which a user can write freely. Hereinafter, the area E102 is sometimes referred to as a user writing area E102. Preferably, the area E101 and the area E102 have a rectangular shape, which facilitates area extraction. Preferably, the area E101 is colored in a color other than those used for the background and characters.

Figure 19:
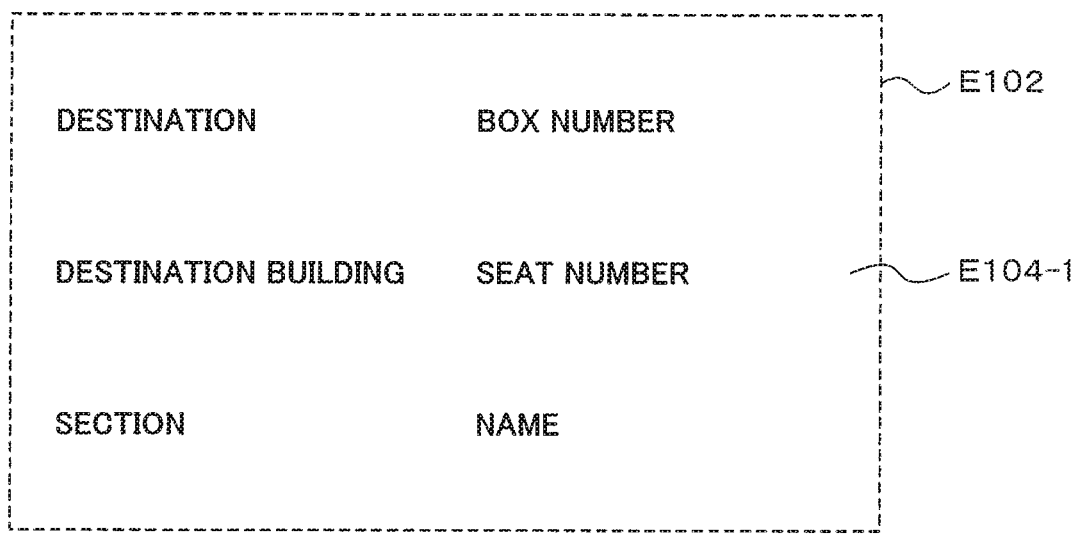
FIG. 19 is an explanation diagram illustrating a design example of a user writing area of a printed label.
Figure 21:
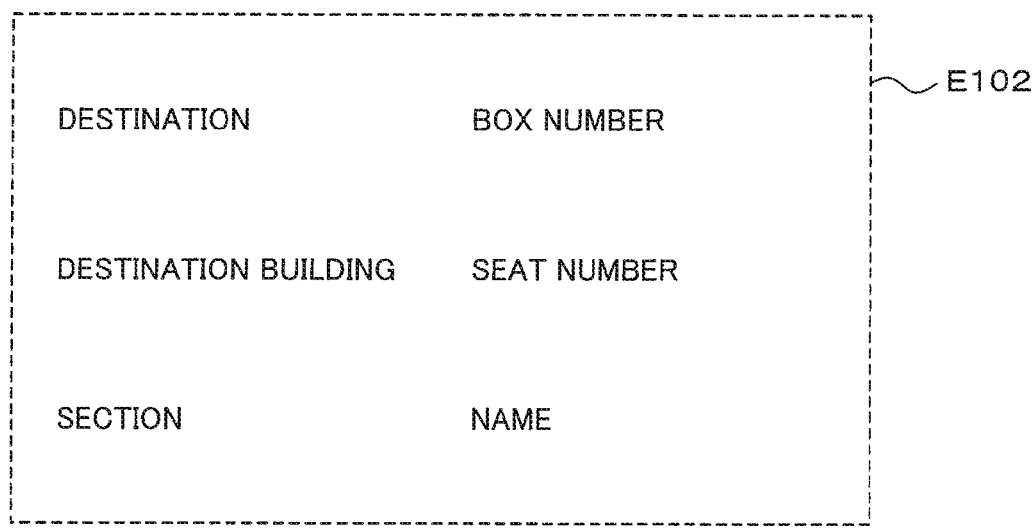
FIG. 21 is an explanation diagram illustrating a design example of a user writing area of a printed label.
Figure 22:
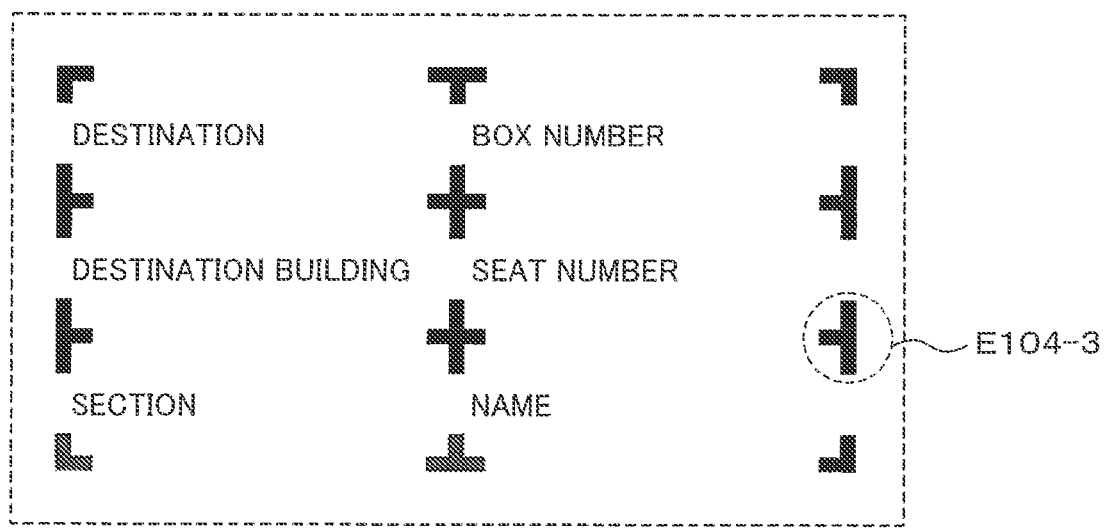
FIG. 22 is an explanation diagram illustrating a design example of a user writing area of a printed label.
Figure 23:
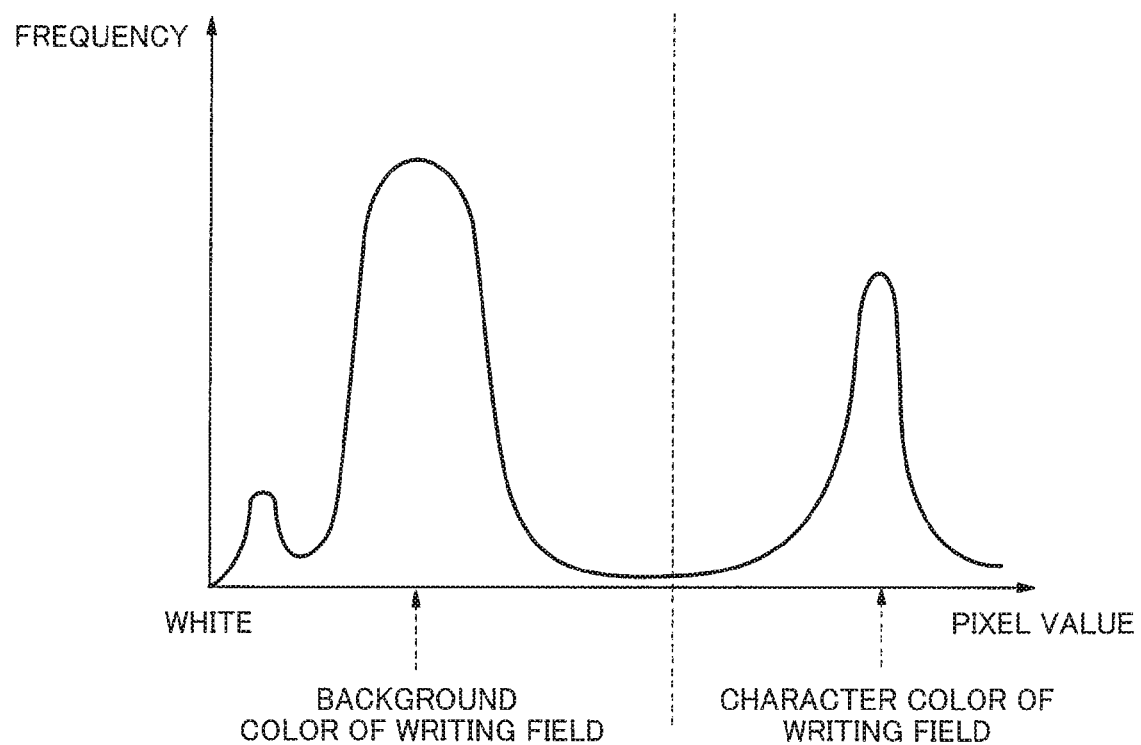
FIG. 23 is an explanation diagram illustrating an example of a histogram obtained with respect to a user writing area 203.

FIG. 19 to FIG. 22 are explanation diagrams illustrating other design examples of the user writing area E102. For example, as illustrated in FIG. 19, the user writing area E102 may have a writing field, which is an area serving as a guide for a user writing characters (including special characters such as symbols), printed in a light color such as yellow (with a difference from the background color being equal to or less than a predetermined amount) (see a reference numeral E104-1). With a coloring visible to the human eye but difficult for a machine to distinguish, as described above, the distribution of pixel values is largely divided into two on a histogram for the user writing area E102 as illustrated in FIG. 23, making it easier to separate the characters from the background.

Consequently, it is possible to obtain a printed label that is easy for a user to write on while maintaining identification performance. a print color of a background may be predetermined, for example, by experiments in which printed labels are captured with an imaging means employed for capturing at least one of inputted images used in the present system, and a color is selected such that the distribution of pixel values constituting characters and the distribution of pixel values constituting the background are separated from each other. Labels can be printed in the color so selected. Herein, the input image is a recording image or a search image. The imaging means is a camera, a scanner and the like. The pixel values constituting characters are brightness values or pixel values of colors such as RGB (red, green, and blue). The pixel values constituting the background are brightness values or pixel values of colors such as RGB. A background is an area of the user writing area in which no characters are written or printed. A background is an area including, for example, a part of the user writing area other than the writing field (a margin part of the user writing area), a frame line of the writing field, if any, and a part of the writing field in which nothing has been initially printed (a margin part of the writing field). Considering easiness of separation of the characters and the background, it is preferable that overlap between the distribution of the pixel values constituting the characters and the distribution of the pixel values constituting the background is 0. Assuming that a color used in the background may not be clearly captured, the overlap between the distributions needs not be always 0 and an upper limit value may be set as appropriate. For example, an upper limit of the number of pixels in the overlapping distributions may be set as follows.

The upper limit of pixel values=($\alpha \times$(the length of the boundary lines between the writing field and the margin part of the user writing area)+$\beta \times$(the length of the boundary lines between the margin part of the user writing area and the characters)+$\gamma \times$(the length of the boundary lines between the characters and the margin part of the writing field))$\times n$.

Here, $\alpha$, $\beta$, and $\gamma$ are real numbers equal to or more than 0 and equal to or less than 1, and n is a real number normally equal to or more than 0 and equal to or less than 4. In this way, according to a method for obtaining a connection area, a threshold value of a brightness value (or a pixel value) for separating a character from a background may be set in advance. Furthermore, a statistical method for deciding whether each pixel is a character or a background, such as a discrimination analysis method also called Otsu binarization may be used. Furthermore, in consideration of the influence of adjacent pixels, a result may also be obtained through formulating as an optimization problem.

Figure 20:
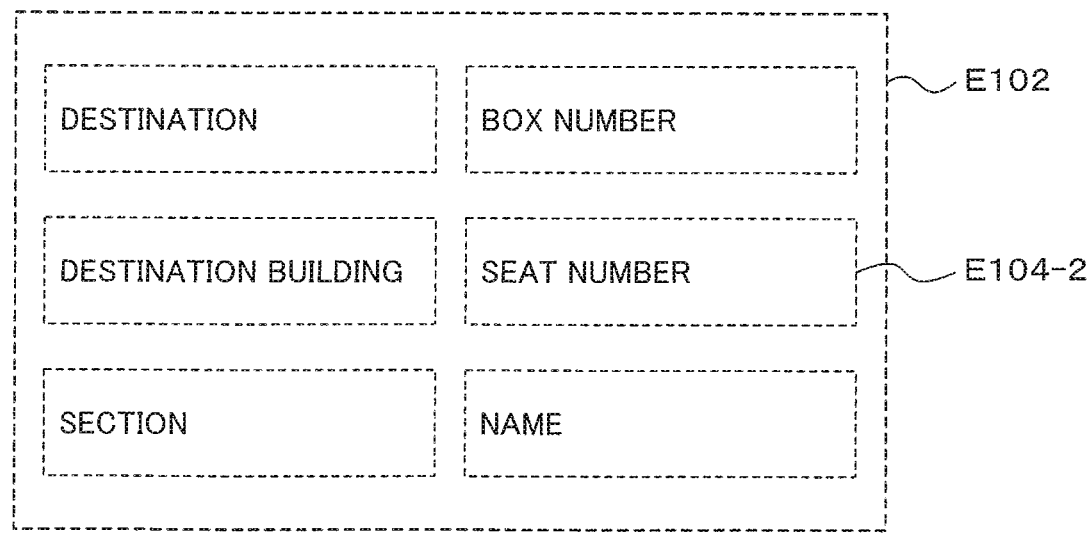
FIG. 20 is an explanation diagram illustrating a design example of a user writing area of a printed label.

Further, as illustrated in FIG. 20, for example, the user writing area E102 may have a light color or a narrow line (a dotted line is also possible) printed along the wiring field (see a reference numeral E104-2). As illustrated in FIG. 21, only item names may be printed and division lines of the wiring field may not be provided. As illustrated in FIG. 22, the user writing area E102 may have division symbols printed at boundaries of the wiring fields (see a reference numeral E104-3). When there are division symbols, simple cutting is possible by an extraction process of a connection area even in the case of a dark color. Furthermore, the division symbols may be printed with a color same as or similar to a specified character color. In such a case, it is possible to verify all connection areas without distinguishing the connection areas of the characters from the connection area of the division symbols.

It should be noted that the designs of the printed label illustrated in the above are for illustrative purposes only and the present invention is not limited thereto. Elements (various areas) included in the printed label, and the configurations, positions and the like of areas may be appropriately changed.

As described above, according to the present exemplary embodiment, a user is able to manage transport situations of packages to be transported through only a simple screen operation.

In addition, FIG. 11 illustrates the example in which the check list production unit 320 and the check list verification unit 330 are separately mounted; however, the check list production unit 320 and the check list verification unit 330 may be mounted without being separated from each other. In such a case, the label image generating sections 322 and 332 may be mounted as one label image generating section. Similarly, the additional image recording sections 325 and 335 and the check list display sections 326 and 336 may be mounted as one section.

Figure 24:
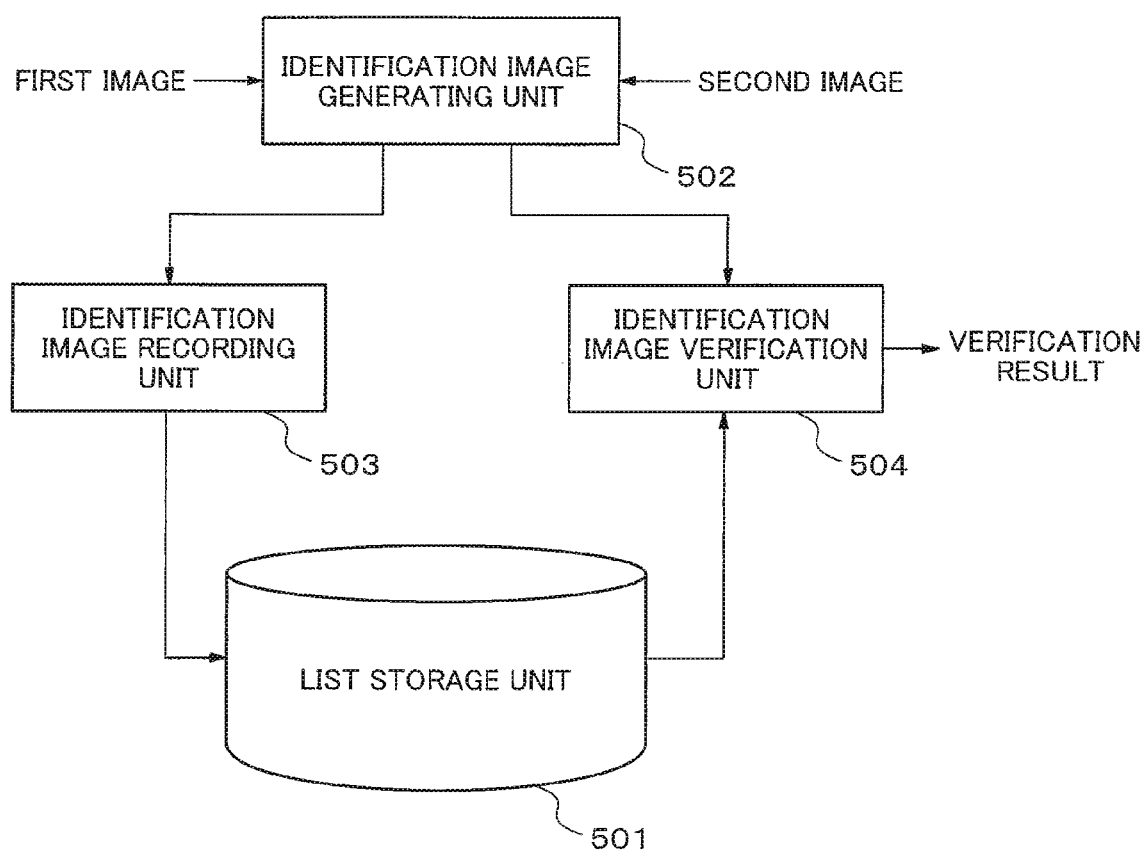
FIG. 24 is a block diagram illustrating a minimum configuration example of a management system common to each exemplary embodiment of the present invention.

Next, a minimum configuration of a management system common to each exemplary embodiment of the present invention will be described. FIG. 24 is a block diagram illustrating a minimum configuration of a management system according to the present invention. The management system illustrated in FIG. 24 includes a list storage unit 501, an identification image generating unit 502, an identification image recording unit 503, and an identification image verification unit 504.

The list storage unit 501 (for example, the list storage unit 11 and the check list storage unit 311) stores a list of objects to be managed in which an identification image for identifying the objects to be managed is recorded. In the identification image, unique identifiers have been associated with each identification unit which is a minimum unit for identifying the objects to be managed.

The identification image generating unit 502 (for example, the identification image generating unit 14 and the label image generating sections 322 and 332) detects a predetermined part of the objects to be managed, or an identifying part serving as a predetermined attachment provided to the objects to be managed and having features that enable identification of the objects to be managed, from an input image. Then, the identification image generating unit 502 generates an identification image in which the detected identifying part is expressed at a predetermined orientation and size in an image region.

The identification image recording unit 503 (for example, the identification image recording unit 15 and the label image recording section 323) records an identification image generated from a first image in the list of objects to be managed as an identification image of a designated identification unit when the first image has been inputted, wherein the first image is obtained by capturing the identifying part of the objects to be managed.

The identification image verification unit 504 (for example, the identification image verification unit 16 and the label image verification section 333) uses an identification image generated from a second image as a key image and verifies the key image against each identification image recorded in the list of objects to be managed when the second image has been inputted, wherein the second image is obtained by capturing the identifying part of the objects to be managed.

Consequently, according to the management system with a minimum configuration, it is possible to reduce labor and processing load during list production and list verification while achieving sufficient identification performance.

The identification image generating unit 502 may also include the following configuration.

Area detection section for detecting image region of identifying part included in input image Area cutting section for cutting predetermined image region including image region of identifying part from input image based on information on image region of identifying part detected by area detection section and generating identification image including cut image region Inclination correction section for performing inclination correction process with respect to identification image generated by area cutting section The inclination correction section may perform three-dimensional angular transformation such that the orientation of an identifying part in a corrected image region is a correct orientation decided in advance.

Furthermore, the identification image generating unit may include the following configuration.

Area detection section for detecting image region of identifying part included in input image Area cutting section for cutting image region corresponding to rectangle that circumscribes identifying part from input image based on information on image region of identifying part detected by area detection section, and for generating identification image including predetermined cut image region The management system may include a master image storage unit for storing a master image which is an image for detecting an identifying part from an input image and an image expressing features of the identifying part, and based on the master image, the identification image generating unit may generate an identification image from the input image.

The list storage unit 501 may store a list of objects to be managed, in which an attached image expressing information on the objects to be managed is recorded, in association with identifiers. In such a case, the management system may include an attached image input part for inputting an attached image of objects to be managed, which belong to a designated identification unit, and an attached image recording unit for recording the inputted attached image in the list of objects to be managed as an attached image of the designated identification unit.

The management system may also include a display unit for displaying a search result screen which includes an area for displaying the following images when the second image has been inputted.

Key image which is identification image obtained from second image

Recording identification image which is identification image most similar to key image in list of objects to be managed Attached image of identification unit to which recording identification image belongs The identifying part may be a printed label provided to the objects to be managed.

The management system is a management system, for example, for managing packages to be transported in a distribution system. In the management system, the objects to be managed may be the package to be transported. In such a case, the list storage unit may store a list of objects to be managed, in which information indicating package transport situations is recorded, in association with identifiers. The management system may include a situation recording unit. The situation recording unit allows a user to input in a search screen an image obtained by capturing packages as a second image, at each check point. Then, as a result of verification using an identification image obtained from the inputted search screen as a key image, the situation recording unit associates the key image with identifiers of recognized objects to be managed and records the information indicating package transport situations in the list of objects to be managed.

Furthermore, as a result of verification of an identification image obtained from the inputted first screen, when information indicating package transport situations at a corresponding check point has been already recorded in association with specific identifiers, the situation recording unit may display the fact to a user. The situation recording unit may count the number of times overlappingly recognized and record the counted number in the list.

The management system is a management system for managing packages to be delivered in a distribution system. The management system may include a check point recording unit. The check point recording unit records a list storage unit, which stores a list of objects to be managed in which information indicating a check point is recorded, and information, which indicates a check point of a designated identification unit, in the list of objects to be managed in association with identifiers.

before recording an identification image, the identification image recording unit 503 may use the identification image as a key image and verify the identification image against each identification image recorded in the list of objects to be managed, and when an identification image, in which the degree of coincidence with the key image is equal to or more than a predetermined value, has been recorded in the list of objects to be managed, the identification image recording unit 503 may display the fact to a user.

In the aforementioned example, an image has been mainly described to be a grayscale image; however, a color image may be used. In the case of using a color image, it is possible to convert the color image into a grayscale by using an equation of converting the color image into a grayscale from an arbitrary color space (RGB, YUV and the like). The color image may also be divided into each channel image (for example, in the case of RGB, an image using R as a pixel value, an image using G as a pixel value, and an image using B as a pixel value), and the above-described verification process is performed in respective color spaces, so that results may be integrated using the logical sum and logical product (OR and AND operations) and the like. In the case of obtaining a connection area from the color image, a well-known clustering method may be applied in color spaces, and a set of colors of the same clusters may be used as a connection area.

Furthermore, in the above, as an example of a verification method of images, an example, in which image feature amounts calculated from images to be verified are compared with one another, has been illustrated. In the case of performing the verification of the images by the comparison of such image feature amounts, when an identification image serving as a verification destination is recorded in a list, image feature amounts may be extracted from the identification image and the detected image feature amounts may be recorded in the list as additional information. In this way, since it is possible to omit a process of extracting image feature amounts from each identification image in the list at the time of verification with a key image, it is advantageous that a verification process is performed at a high speed. It is also similar to verification of an inputted recording image and a master image, which is performed when an image region of an identifying part is detected from the recording image. That is, when the master image is recorded, image feature amounts may be extracted from the master image and be recorded. In this way, since it is possible to omit a process of extracting image feature amounts from the master image at the time of verification with the recording image, it is advantageous that a detection process of an identification area is performed at a high speed.

So far, the present invention has been described with reference to the exemplary embodiments and the examples; however, the present invention is not limited to the aforementioned embodiments and examples. In the configuration and details of the present invention, various modifications within the scope of the present invention can be readily apparent to those skilled in the art.

This application is based on Japanese Patent Application No. 2013-226175 filed on Oct. 31, 2013, the contents of which are incorporated herein by reference.

INDUSTRIAL APPLICABILITY

The present invention can be preferably applied not only in a distribution system but for the purpose of managing persons and objects by using a list.

REFERENCE SIGNS LIST

11, 501 list storage unit
12, 321 recording image input unit 13, 331 search image input unit
14, 14A, 14B, 502 identification image generating unit
141 area detection section
142 area cutting section
143 inclination correction section
15, 503 identification image recording unit
16, 504 identification image verification unit
17, 312 master image storage unit
18, 18A, 18B, 324, 334 additional information input unit
19, 19A, 19B, 325, 335 additional information recording unit
20, 20A, 20B list display unit
110, 310 storage device
120 list production device
130 list verification device
311 check list storage unit
320 check list production unit
322, 332 label image generating section
323 label image recording section
326, 336 check list display section
327 attached image input part
328 check point input part
330 check list verification unit
333 label image verification section
337 check result input part
600 information processing apparatus
601 CPU
602 ROM
603 RAM
604 program
605 storage device
606 storage medium
607 drive device
608 communication interface
609 network
610 input/output interface
611 bus

What is claimed is:

1. A management system comprising:
at least one processor configured to implement:
a list storage unit configured to store a list of objects to be managed in which identification images are recorded, each identification image being used for identifying the object to be managed and being associated with a unique identifier in each identification unit, the identification unit serving as a minimum unit for identifying the object to be managed;
an identification image generating unit configured to generate an identification image when detecting an identifying part from an input image by comparing the input image and a master image, the identifying part being a predetermined part of an object to be managed or a predetermined attachment to the object to be managed and having a characteristic feature that enables identification of the object to be managed, the identification image depicting the identifying part at a predetermined orientation and size in an image region, and the master image depicting a characteristic feature of the identifying part and being used for detecting the identifying part from the input image;
an identification image recording unit configured to, when a first image capturing the identifying part of an object to be managed is inputted, record an identification image generated from the first image in the list of objects to be managed as the identification image of a designated identification unit; and
an identification image verification unit configured to, when a second image capturing the identifying part of an object to be managed is inputted, use an identification image generated from the second image as a key image, and verify the key image against respective identification images recorded in the list of objects to be managed.

2. The management system according to claim 1, wherein the identification image generating unit includes:
an area detection unit configured to detect an image region of the identifying part included in the input image;
an area cutting unit configured to cut a predetermined image region including the image region of the identifying part from the input image based on information on the image region of the identifying part detected by the area detection unit, and generate an identification image including the cut image region; and
an inclination correction unit configured to perform inclination correction processing with respect to the identification image generated by the area cutting unit.

3. The management system according to claim 2, wherein the inclination correction unit is further configured to perform a three-dimensional angular transformation such that an orientation of the identifying part in a corrected image region is substantially equal to a predetermined correct orientation.

4. The management system according to claim 1, wherein the identification image generating unit comprises:
an area detection unit configured to detect an image region of the identifying part included in the input image; and
an area cutting unit configured to cut an image region corresponding to a rectangle that circumscribes the identifying part from the input image, based on information on the image region of the identifying part detected by the area detection unit, and generate an identification image that includes the predetermined image region that is cut.

5. The management system according to claim 1, wherein the at least one processor is further configured to implement:
a master image storage unit configured to store a master image which is an image for detecting the identifying part from the input image, the master image depicting a characteristic feature of the identifying part.

6. The management system according to claim 1, wherein the list storage unit is further configured to store the list of objects to be managed, attached images each expressing information on the object to be managed is recorded in association with the identifiers, and comprises:
an attached image input unit configured to input the attached image of the object to be managed belonging to a designated identification unit; and
an attached image recording unit configured to record the attached image inputted in the list of objects to be managed as an attached image of the designated identification unit.

7. The management system according to claim 6, wherein the at least one processor is further configured to implement:
a display unit configured to, when the second image is inputted, display a search result screen including an area for displaying the key image, which is the identification image generated from the second image, a recorded identification image, which is an identification image most similar to the key image in the list of objects to be managed, and an attached image of an identification unit to which the recorded identification image belongs.

8. The management system according to claim 1, wherein the identifying part is a printed label attached to the object to be managed.

9. The management system according to claim 1,
wherein the management system is a management system for managing packages to be transported in a distribution system,
the objects to be managed are the packages to be transported,
the list storage unit is further configured to store the list of objects to be managed in which information indicating a transport situation of the packages is further recorded in association with the identifier, and
the at least one processor is further configured to implement:
a status recording unit configured to allow a user to input in a search screen an image obtained by capturing the package as the second image at each check point, and record information indicating a transport status of the package in the list of objects to be managed in association with the identifier of a recognized object to be managed as a result of verification using an identification image obtained from the search screen inputted as the key image.

10. A list production device comprising:
at least one processor configured to implement:
a list storage unit configured to store a list of objects to be managed in which identification images are recorded, each identification image being used for identifying the object to be managed and being associated with a unique identifier in each identification unit, the identification unit serving as a minimum unit for identifying the object to be managed;
an identification image generating unit configured to generate an identification image when detecting an identifying part from an input image by comparing the input image and a master image, the identifying part being a predetermined part of an object to be managed or a predetermined attachment to the object to be managed and having a characteristic feature that enables identification of the object to be managed, the identification image depicting the identifying part at a predetermined orientation and size in an image region, and the master image depicting a characteristic feature of the identifying part and being used for detecting the identifying part from the input image; and
an identification image recording unit that, when a first image capturing the identifying part of an object to be managed is inputted, records an identification image generated from the first image in the list of objects to be managed as the identification image of a designated identification unit.

11. A list production method comprising:
generating an identification image when detecting an identifying part from a first image by comparing the first image and a master image, the identifying part being a predetermined part of the objects to be managed or a predetermined attachment provided to the objects to be managed and has characteristics feature that enables identification of the object to be managed, the identification image depicting the identifying part at a predetermined orientation and size in an image region, and the master image depicting a characteristic feature of the identifying part and being used for detecting the identifying part from the input image; and
associating the identification image generated from the first image with a unique identifier in each identification unit serving as a minimum unit for identifying the object to be managed and recording the identification image in a list of objects to be managed in which an identification image for identifying the object to be managed is recorded.

12. A management method comprising:
generating a first identification image when detecting a first identifying part from a first image by comparing the first image and a master image, the first identifying part being a predetermined part of the objects to be managed or a predetermined attachment provided to the objects to be managed and an identifying part having characteristics feature that enables identification of the object to be managed is inputted, the first identification image depicting the first identifying part at a predetermined orientation and size in an image region, and the master image depicting a characteristic feature of the first identifying part and being used for detecting the first identifying part from the first image;
associating the identification image generated from the first image with a unique identifier in each identification unit serving as a minimum unit for identifying the objects to be managed and recording the identification image in a list of objects to be managed in which the identification image for identifying the objects to be managed is recorded;
generating a second identification image when detecting a second identifying part from a second image by comparing the second image and the master image, the second identifying part being a predetermined part of the objects to be managed or a predetermined attachment provided to the objects to be managed and an identifying part having characteristics feature that enables identification of the object to be managed is inputted, the second identification image depicting the second identifying part at a predetermined orientation and size in an image region, and the master image depicting a characteristic feature of the second identifying part and being used for detecting the second identifying part from the second image; and
using the second identification image generated from the second image as a key image, and verifying the key image against each identification image recorded in the list of objects to be managed.

13. A non-transitory computer readable recording medium storing a management program that enables a computer, which includes a list storage unit for storing a list of objects to be managed in which identification images are recorded, the identification image being used for identifying the object to be managed and associated with a unique identifier in each identification unit serving as a minimum unit for identifying the object to be managed, or an access unit capable of accessing the list storage unit, to perform
a process of, generating an identification image when detecting an identifying part from a first image by comparing the first image and a master image, the identifying part being a predetermined part of objects to be managed or a predetermined attachment provided to the objects to be managed and an identifying part having characteristics feature that enables identification of the object to be managed, the identification image depicting the identifying part at a predetermined orientation and size in an image region, and the master image depicting a characteristic feature of the identifying part and being used for detecting the identifying part from the first image; and a process of associating the identification image generated from the first image with a unique identifier in each identification unit serving as a minimum unit for identifying the objects to be managed and recording the identification image in the list of objects to be managed.

14. A non-transitory computer readable recording medium storing a data structure applied to a list for managing objects to be managed by the management system according to claim 1, the non-transitory computer readable recording medium comprising:

an identifier of an identification unit serving as a minimum unit for identifying the object to be managed;

an identification image in which an identifying part, which is a predetermined part of the objects to be managed belonging to the identification unit or a predetermined attachment provided to the objects to be managed and an identifying part having characteristics feature that enables identification of the object to be managed, has been expressed at a predetermined orientation and size in an image region; and an attached image in which information on the object to be managed belonging to the identification unit has been expressed.

15. A printed label for the management system according to claim 1, the printed label comprising:

a first area having a characteristic feature capable of specifying an orientation; and a second area including a writing field serving as a guide for a user writing a character, wherein a difference in color between the writing field and a remaining field of the second area excluding the writing field and a difference in character color used in the writing field and the remaining field are each equal to or more than a predetermined value, the writing field is provided with a frame defined by a line of a color such that a difference between colors of the writing field and areas other than the writing field and the color of a character is equal to or more than the predetermined amount, or a division symbol is provided at a boundary of the writing field.

* * * * *